United States Patent
Swartz et al.

(10) Patent No.: US 6,236,994 B1
(45) Date of Patent: May 22, 2001

(54) METHOD AND APPARATUS FOR THE INTEGRATION OF INFORMATION AND KNOWLEDGE

(75) Inventors: Ronald M. Swartz, Dresher; Jeffrey L. Winkler, Collegeville; Evelyn A. Janos, West Chester, all of PA (US); Igor Markidan, Cherry Hill, NJ (US); Qun Dou, North Wales, PA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/106,335

(22) Filed: Jun. 29, 1998

Related U.S. Application Data

(60) Provisional application No. 60/062,933, filed on Oct. 21, 1997.

(51) Int. Cl.[7] .................................................. G06F 17/30
(52) U.S. Cl. ............................ 707/6; 707/101; 707/102; 707/104
(58) Field of Search ................................. 707/101, 6, 102, 707/104; 706/50, 59, 61

(56) References Cited

U.S. PATENT DOCUMENTS

| | | | |
|---|---|---|---|
| 5,418,943 | * 5/1995 | Borgida et al. | 707/10 |
| 5,644,686 | 7/1997 | Hekmatpour | 106/45 |
| 5,745,895 | * 4/1998 | Bingham et al. | 707/10 |

OTHER PUBLICATIONS

IEEE publication, "Enterprise Knowledge Management" by Daniel E. O'Leary, pp. 54–61, Mar. 1998.

IEEE publication, Knowledge–management Systems: Converting and Connecting, by Daniel E. O'Leary, pp. 30–33, May 1998.

Computer (Internet Watch), "Web–Based Knowledge Management" by Hermann Maurer, Austria, pp. 122–123, Mar. 1998.

IEEE publication, "Using AI in Knowledge Management: Knowledge Bases and Ontologies" by Daniel E. O'Leary, pp. 34–39, May 1998.

IEEE publication, "Web–Based Knowledge Management for Distributed Design" by Nicholas H.M. Caldwell, pp. 40–47, May 2000.*

Villiers; "New Architecture for Linkage of SAS/PH–Clinical Software with Electronic Document Management Systems"; Revised Jun. 19, 1997; pp 1–7.

FileNet; FileNet's Foundation for Enterprise Document Management Strategy White Paper; pp 1–27, No date.

* cited by examiner

*Primary Examiner*—Thomas Black
*Assistant Examiner*—Diane D. Mizrahi
(74) *Attorney, Agent, or Firm*—William F. Eipert; Duane C. Basch

(57) ABSTRACT

The present invention is a method and apparatus for first integrating the operation of various independent software applications directed to the management of information within an enterprise. The system architecture is, however, an expandable architecture, with built-in knowledge integration features that facilitate the monitoring of information flow into, out of, and between the integrated information management applications so as to assimilate knowledge information and facilitate the control of such information. Also included are additional tools which, using the knowledge information enable the more efficient use of the knowledge within an enterprise, including the ability to develop a context for and visualization of such knowledge.

20 Claims, 17 Drawing Sheets

1210

| Object Name | Format | Modify Date |
|---|---|---|
| Virtual Document Manager - Clinical Study Report: Results of a phase 1 Trial of Co... | | |
| No changed or locked items for "admprod" | | |
| − Clinical Study Report Results of a phase I T... | Word 6.0 (MacOS), 6... | 10/20/97 10:06:23 AM |
| − 1 Chemistry Section.doc | Word 6.0 (MacOS), 6... | 10/20/97 03:20:51 PM |
| 1.1 Chemistry Section - A.doc | Word 6.0 (MacOS), 6... | 10/20/97 03:20:49 PM |
| 1.2 Chemistry Section - B.doc | Word 6.0 (MacOS), 6... | 10/20/97 03:20:50 PM |
| 1.3 Chemistry Section - C.doc | Word 6.0 (MacOS), 6... | 10/20/97 03:20:50 PM |
| − 2 Case report forms.doc | Word 6.0 (MacOS), 6... | 10/20/97 03:20:48 PM |
| 2.1 Case report tabulations.doc | Word 6.0 (MacOS), 6... | 10/20/97 03:20:49 PM |
| − 3 Statistical section.doc | Word 6.0 (MacOS), 6... | 10/20/97 03:21:06 PM |
| 3.1 Clinical Statistical Summary | Word 6.0 (MacOS), 6... | 10/20/97 09:05:17 PM |
| − 4 Statistical Appendices | Word 6.0 (MacOS), 6... | 10/20/97 05:31:03 PM |
| − 4.1 Clinical Data Section | Word 6.0 (MacOS), 6... | 10/20/97 07:25:44 PM |
| 4.1.1 AE ANOVA PLOTS OUTP... | ASCII Text (DOS, Win... | 10/20/97 02:07:48 PM |
| 4.1.2 Demographic Frequency | ASCII Text (DOS, Win... | 10/20/97 07:24:27 PM |
| 4.1.3 Diastolic Blood Pressure | ASCII Text (DOS, Win... | 10/20/97 07:23:44 PM |
| − 4.2 Adverse Event Listings & Tabul... | Word 6.0 (MacOS), 6... | 10/20/97 05:31:11 PM |
| 4.2.1 AE ANOVA PLOTS OUTP... | ASCII Text (DOS, Win... | 10/20/97 12:47:38 PM |
| − 4.3 Laboratory Results | Word 6.0 (MacOS), 6... | 10/18/97 07:18:32 PM |
| 4.3.1 Hemoglobin Anova Plot... | ASCII Text (DOS, Win... | 10/18/97 01:18:32 PM |
| 4.3.2 Hemoglobin Anova Plot... | Computer Graphics Me...| 10/20/97 07:05:24 PM |
| 4.3.3 Hemoglobin Anova Plot... | Computer Graphics Me...| 10/20/97 07:29:55 PM |
| 4.3.4 Hemoglobin Anova Plot... | Computer Graphics Me...| 10/20/97 07:33:38 PM |
| 4.3.5 Creatinine Anova Plots | ASCII Text (DOS, Win... | 10/20/97 07:22:46 PM |
| 4.4 Efficacy Analysis | Word 6.0 (MacOS), 6... | 10/20/97 05:31:34 PM |

FIG. 12

CLINICAL STUDIES

Malignant Pleural Mesothelioma: results of a phase II Trial of Combined Chemotherapy.

We conducted a prospective phase II trial of a combined four drugs chemotherapy PMFE for patients with unresectable mesothelioma: Cisplatin 60 mg\m2 dat 1, 5 Fluorouracil 60 mg day 1 -> 4, Elvorin 100mg\m2 days 1->, C Mitomycin 10mg day 3, Etoposide 100mg\m2 IV days 1 -> 3 or oral Etoposide 50 mg\day 1 -> 21; one cycle every 28 days. Tumour response was evaluated by chest CT Scan 15 days after the fourth cycle.

Table 1.3.5 Hemoglobin Anova Plot Summary Table

Study Treatment=Control – Active

| AESEV | Minimum value of DMAGE | Lower Quartile of DMAGE | Median of DMAGE | Upper Quartile of DMAGE | Maximum value of DMAGE |
|---|---|---|---|---|---|
| 1 | 24 | 37.437800 | 43.500000 | 42.000000 | 46.562200 |
| 2 | 17 | 36.579298 | 41.000000 | 42.000000 | 47.420702 |

*FIG. 15*

METHOD AND APPARATUS FOR THE INTEGRATION OF INFORMATION AND KNOWLEDGE

PRIORITY TO PRIOR PROVISIONAL APPLICATION

Priority is claimed to Provisional Application Ser. No. 60/062,933, filed on Oct. 21, 1997 Pending.

This invention relates generally to an architecture for the integration of data, information and knowledge, and more particularly to a method and apparatus that manages and utilizes a knowledge repository for the purpose of enabling easy access, manipulation and visualization of synchronized data, information and knowledge contained in different types of software systems.

SOURCE CODE APPENDIX

This patent document contains a source code appendix, including a total of 542 pages.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

Companies operating in regulated industries (e.g., aerospace, energy, healthcare, manufacturing, pharmaceuticals, telecommunications, utilities) are required to manage and review large amounts of information that is frequently generated over the course of several years. The principal components of this information are the structured numerical data and the unstructured textual documents. The data are collected and run through complex statistical analyses that are then interpreted and reported by industry experts to meet stringent requirements for regulatory review. Separate groups or organizations produce multiple iterations of these data and documents, with potentially thousands of statistical data analysis files linked to thousands of dependent documents. Often such groups have independently evolved specialized and often incompatible procedures and work practices. Correspondingly, separate software systems for data analysis and document management have been adopted as discrete solutions. The dichotomy existing in both the information sources and work groups jeopardizes the common goal. Hence, the challenge is to integrate and synchronize the flow of all information, processes and work practices necessary for making better and faster decisions within an enterprise.

Currently the process of integrating data and data analysis reports with regulatory documents can be characterized as (a) an entirely manual process (i.e., paper is copied and collated into a hard copy compilation), (b) a multi-step electronic process (i.e., files are placed into a central file location by one department and retrieved by another), or (c) an internally developed, custom solution that is used to automate portions of the process. Problems with such processes typically include:

complexity and error prone nature of the systems needed to manage the process(es) (e.g., manual updates to related documents and data, demands for maintaining a "mental" mapping of these objects to each other (i.e., a meta information catalogue) and enforcing the integrity of the defined object "linkages" throughout the business process);

difficulty in locating and working with interrelated documents and data throughout the information generation lifecycle (a lack of integrated textual and numerical information severely constrains enterprise information workflow and decision making);

a lack of an efficient mechanism, in the current document management and data analysis systems, for locating and working with the many different types of information maintained in separate systems;

a failure to recognize, appreciate and enable the dependencies between data and documents throughout the information generation lifecycle—a complex information workspace topology exists that is known only intrinsically by the users who must maintain the referential integrity of these related information objects; and inflexibility of a process, during the information generation lifecycle, to handle situations where data changes force a series of document changes, which may in turn require modifications of other documents.

On the other hand, the present invention will alleviate such problems using an architecture that includes a knowledge repository for the purpose of enabling easy access, manipulation and visualization of complete and synchronized information contained on a plurality of software platforms.

Heretofore, a limited number of patents and publications have disclosed certain aspects of knowledge management systems, the relevant portions of which may be briefly summarized as follows:

U.S. Pat. No. 5,644,686 to Hekmatpour, issued Jul. 1, 1997, discloses a domain independent expert system and method employing inferential processing within a hierarchically-structured knowledge base. Knowledge engineering is characterized as accommodating various sources of expertise to guide and influence an expert toward considering all aspects of the environment beyond the individual's usual activities and concerns. This task, often complicated by the expert's lack of analysis of their thought content, is accomplished in one or more approaches, including interview, interaction (supervised) and induction (unsupervised). The expert diagnostic system described by Hekmatpour combines behavioral knowledge presentation with structural knowledge presentation to identify a recommended action.

U.S. Pat. No. 5,745,895 to Bingham et al, issued Apr. 28, 1998, discloses a method for associating heterogeneous information by creating, capturing, and retrieving ideas, concepts, data, and multi-media. It has an architecture and an open-ended-set of functional elements that combine to support knowledge processing. Knowledge is created by uniquely identifying and interrelating heterogeneous datasets located locally on a user's workstation or dispersed across computer networks. By uniquely identifying and storing the created interrelationships, the datasets themselves need not be locally stored. Datasets may be located, interrelated and accessed across computer networks. Relationships can be created and stored as knowledge to be selectively filtered and collected by an end user.

FileNet's "Foundation for Enterprise Document Management Strategy White Paper", Sep. 1997, suggests a major industry trend that is being generated by users: the convergence of workflow, document-imaging, electronic document management, and computer output to laser disk into a family of products that work in a common desktop PC environment. FileNet's foundation is a base upon which companies can easily build an enterprise-wide environment to access and manage all documents and the business processes which utilize them. FileNet's architectural model is based on the client/server computing paradigm. Four types of generic client applications are described, the four main elements include:

Searching—the ability to initiate and retrieve information that "indexes" documents across the enterprise by accessing industry standard databases and presenting the results in an easy to use and read format.

Viewing—the ability to view all document types and work with them in the most appropriate way, including viewing, playing (video or voice), modifying/editing, annotating, zooming, panning, scrolling, highlighting, etc.

Development tools—industry-standard based development tool sets (e.g. Active X, PowerBuilder) that allow customers or their selected application development or integration partners to create specific applications that interface with other applications already existing in the organization.

Administrative applications—applications that deliver management and administrative information to users, developers, or system administrators that allow them to optimize tasks, complete business processes or receive data on document properties and functions.

SAS Institute's Peter Villiers has described, in a paper entitled "New Architecture for Linkages of SAS/PH-Clinical® Software with Electronic Document Management Systems" (June 1997, SAS Institute), an interface between SAS Institute's pharmaceutical technology products and document management systems (e.g., Documentum™ Enterprise Document Management System). In the described implementation, a point-to-point system (PH—Document Linker Interface and Documentum to SAS/PH-Clinical link back) is established to enable two-way transfer of information between the statistical database and the document repository.

While application integration solutions are being used to link major information management components, such as imaging, document management and workflow, none of the available integration methods manage the information overload or the contextual complexities characteristic of the regulatory application process. In order to make informed decisions, all information sources that are part of this process must be coalesced as part of a knowledge management architecture.

In the example of a regulated industry (e.g., pharmaceuticals), the primary problem is generally viewed as how to synthesize all the information to prove a regulatory application case as quickly as possible while not losing the context. Automating and synchronizing the flow of all information helps expedite the review process. But the bigger challenge is to preserve the context necessary for applying knowledge. A system is needed that enables users to put their knowledge to work; to answer such questions as: Are the documents consistent with the data? Were iterations of the data and documents synchronized? What was done to preserve the integrity of the data? Who performed the work and what were their qualifications? Appropriate answers to these questions will influence reviewer/regulator confidence in the data and assertions; yet in current systems, the information gets buried, lost or is never recorded. The present invention is directed to a system, architecture and associated processes that may be used to identify, confirm, integrate and enable others to follow the "path" that was used in meeting the regulatory approval requirements.

In accordance with the present invention, there is provided a knowledge integration system for providing application interoperability and synchronization between heterogeneous document and data sources, comprising: a first database memory; a data source suitable for independently performing data analysis operations using data stored within the first database to generate data and analysis results; a document source, including a document database memory, for capturing knowledge and storing the knowledge in the form of documents, validating the accuracy of the knowledge, and making the captured knowledge available across a network; and a knowledge integration application, running on a client/server system having access to the data source and the document source, for managing the flow of information between the data source and the document source, thereby enabling the integration of data and analysis results with the documents and provide links to automatically update the documents upon a change in the data or analysis results.

The present invention represents an architecture, embodied for example in a software product suite, that manages and utilizes a knowledge repository, via knowledge integration middleware (KIMW), for the purpose of enabling easy access, manipulation and visualization of complete and synchronized information contained in different software systems. Aspects of the present invention include:

the use of knowledge integration middieware in conjunction with traditional application integration middleware to build and manage an integration knowledge repository;

providing a generic mechanism for bridging structured and unstructured data with uniform access to information;

the specification of four integrated knowledge-based software applications (described below) that collectively enable information integration with knowledge linkage, visualization and utilization of structured, unstructured and work practice data and metadata produced by knowledge workers in an enterprise;

use of a knowledge repository containing record of integration transactions, context information from users and applications, information metadata catalog, knowledge access control, application activation rules, metadata and rules for knowledge integration, knowledge generation, knowledge visualization, "live" knowledge links, task execution, and case-based data for regulatory review;

use of a three dimensional (3D) interface in conjunction with a user-specific conceptual schema providing access to enterprise information wherever it is stored and managed; and implementation of a rule-based paradigm for filing marketing applications to regulatory agencies that uses hypothesis/proof/assertion structures.

The present invention will provide application interoperability and synchronization between heterogeneous document and data sources such as those currently managed by disparate enterprise document management and data analysis systems. Initially, the invention will allow users to establish and utilize "live" links between an enterprise document management system and a statistical database. Alternative or improved embodiments of the invention will enable users to define and execute multiple tasks to be performed by one or more applications from anywhere within a document.

Users of knowledge management systems desire an integrated and flexible process for providing Integrated Document Management, Image Management, WorkFlow Management and Information Retrieval. Aspects of the present invention focus on the added insight that a majority of the same customers want their data integrated in this document lifecycle platform as well as where the flow of textual and numerical analysis information are systematically synchronized. Such a system will enable decision makers to have complete information.

One aspect of the invention is based on the discovery that data on the use of documents stored in an enterprise document management system (EDMS) provides insight into the flow of knowledge within the enterprise. This discovery avoids problems that arise in conventional document or knowledge management systems, where the flow of information must be rigorously characterized before or at the time the document is stored into the EDMS.

Another aspect of the present invention is based on the discovery of techniques that can automate the process of transferring data analysis reports to a document management system for regulatory document production, synchronize information flow between data and documents, and provide linkages back to data analysis software. Yet another aspect of the invention embeds and executes "live" knowledge links stored in documents and associated analysis data— allowing users to define and execute multiple tasks to be performed by one or more data or document applications within the information content. Another aspect of the present invention visualizes objects and linkages maintained in the integration knowledge base, preferably using a 3D interface and conceptual schema for access and manipulation of the enterprise information. A final aspect of the present invention generates knowledge documents that are employed to manage a regulatory marketing application process.

The techniques described herein are advantageous because they are flexible and can be adapted to any of a number of knowledge integration needs. Although described herein with respect to preparation of regulatory agency submissions, the present invention has potential use in any enterprise seeking to understand and utilize the information acquired by the enterprise as knowledge. The techniques of the invention are advantageous because they permit the efficient establishment and use of a knowledge repository. Some of the techniques can be used for bridging structured and unstructured data. Other techniques provide for information integration with knowledge linkage, visualization and utilization of structured, unstructured and work practice data and metadata produced by knowledge workers in an enterprise. As a result of the invention, users of the method and apparatus described herein will be able to accurately understand the who, why, when, where and how questions pertaining to information and document use within an enterprise.

BRIEF DESCRIPTION OF THE DRAWINGS

FIGS. 6–17 are illustrative representations of user interface screens depicting aspects of the present invention.

Figure 1:
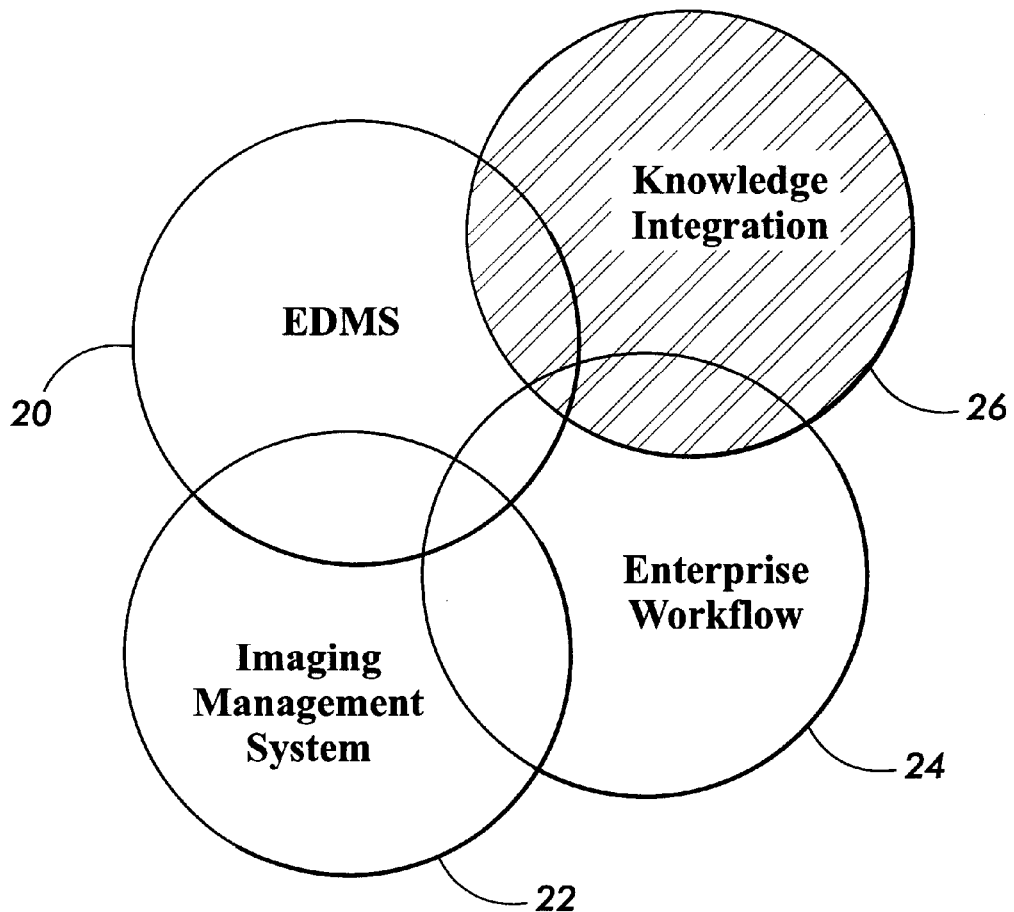
FIG. 1 is a general representation of various components that comprise a knowledge integration system in accordance with he present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

Knowledge, in an organizational or enterprise sense, reflects the collective learning of the individuals and systems employed by the organization. As used herein, the term "knowledge" reflects that portion of the organizational know-how that may be reflected, recorded or characterized in a digital electronic format. A "knowledge repository" is any physical or virtual, centralized or decentralized system suitable for the receipt or recording of the knowledge of any portion of the enterprise.

As used herein, the term "knowledge integration middleware" represents any software used to assist in the integration of disparate information sources and their corresponding applications for the purposes of recording, distributing, and activating knowledge, knowledge applications, or knowledge services. More specifically, knowledge integration middleware is preferably employed to identify (including tracking, monitoring, analyzing) the context in which information is employed so as to enable the use of such context in the management of knowledge.

"Document management" refers to processes, and apparatus on which such processes run, that manage and provide administrative information to users, that allow them to optimize tasks, complete business processes or receive data on document properties and functions. The phrase "Integrated Document Management" refers to a process or system capable of performing document management using multiple independent software applications, each optimized to perform one or more specific operations, and to the process by which information may flow from one application to be incorporated or cause an action within one or more of the other document management processes. An "enterprise document management system" is a document management system implemented so as to capture and manage a significant portion, if not all, of the documents employed within an enterprise.

"Image Management" is a technology to specifically manage image documents throughout their lifecycle; an image management system typically utilizes a combination of advanced image processing and pattern recognition technologies to provide sophisticated information retrieval and analysis capabilities specific to images.

"WorkFlow Management" is a technology to manage and automate business processes. Workflow is used to describe a defined series of tasks, within an organization, that are used to produce a final outcome.

"Information Retrieval" is a technology to search and retrieve information from various information sources; the term generally refers to algorithms, software, and hardware that deal with organizing, preserving, and accessing information that is primarily textual in nature.

A "regulatory agency" is any organization or entity having regulatory control or authorization over a particular industry, market, product or service. Examples of industries subject to review by a regulatory agency include aerospace, energy, healthcare, manufacturing, pharmaceuticals, telecommunications, and utilities.

"Data" refers to distinct pieces of information; "analytical data" refers to the numerical information created during the statistical analysis of data. "Metadata" refers to data about data; as used herein, Metadata characterizes how, when and by whom a particular set of data was collected, and how the data is formatted. "Information" means data that has been analyzed, processed or otherwise arranged into meaningful patterns, whereas "knowledge" means information that can or has been put into productive use or made actionable.

"Live" as used in the phrase "enabling live links" between objects in data analysis and document management systems, means enabling seamless control and functionality between different applications managing such objects.

The following description characterizes an embodiment of the present invention in the context of a pharmaceutical approval process. The description is not intended to in any way limit the scope of the invention. Rather the pharmaceutical embodiment is intended to provide an exemplary implementation to facilitate an understanding of the advantages of the present invention in the context of a regulatory review process.

To further characterize the features of the present invention, consider a pharmaceutical research company that has initiated a large, international clinical study. The study protocol, that defines the conduct of the study (for a new chemical entity), was written by study clinicians (M.D.s). Four years and several millions of dollars later, the statistical analysis failed to support the argument for regulatory application approval. The irony is that the drug was known to be safe and effective. The failure was totally due to a faulty protocol design. This represents a significant monetary loss for the organization—one that might have been avoided with the appropriate knowledge base and tools. At the very least, it should be avoided in the future.

In the scenario presented, and in may regulated industry organizations, teams of experts for all groups 1–5 below made what they believed were appropriate choices at the time.

Expert group 1—Protocol design
    Expert group 2—Case Report Form design
        Expert group 3—Database design
            Expert group 4—Statistical analysis
                Expert group 5—Clinical review There was no "tool" in place to allow any of these teams to visualize and understand the chain of dependent decisions made by fellow group members or members of any of the other groups—let alone the reasoning behind those decisions. As is often the case with regulatory processes, when the statistical analyses were performed, the original teams were not only no longer intact, but there were no representatives left in the company. While preparation of the final submission may uncover errors—why the analysis wasn't working (e.g., missing collection of correct data points), however, the errors are not communicated to the entire set of expert groups since the project was terminated and people were not motivated to dwell on the experience.

Some key advantages of the present invention are the saving of "context" and having ability to visualize and explore past, present and potential decisions, infrastructure setup for individual and enterprise learning, structuring processes, practices, and applications and the interactions between them, that to date has been mostly unstructured and unrecorded. The lessons learned from the scenario described above would suggest there are at least three levels of value in pursuing implementation of a system to solve this type of problem:

1. ABILITY TO AVOID COMPLETELY: If an appropriate tool had been in place whereby the original team would have had the opportunity to "see" or visualize the structure of the work they were planning, including dependencies of various information sources, decision points, etc.

2. ABILITY TO RECOGNIZE EARLY: At the very least if the team had been able to relate the choices they made in the early stages, then there would be at least some chance the teams would have identified problems early on and had the option to correct them.

3. ABILITY TO REFLECT ON PAST: In the worst case, the company loses its monetary investment but at least they would have a well documented case of what not to do. This ultimately could save multiple projects time and money in the future. The next protocols they designed would be less apt to have the same or similar problems; they are building on their experience.

As noted in the scenario described above, companies operating in regulated industries are required to manage and review large amounts of information, frequently information for which generation and analysis occurs over the course of several years. The major components of this information are the structured, numerical data and the unstructured textual documents. The data are collected and put through complex statistical analyses which are interpreted and reported as analytical data by industry experts to meet stringent government requirements for regulatory application and approval. In a typical organization, several disparate groups produce multiple iterations of these data and documents, with thousands of statistical data analysis files linked to thousands of dependent documents. Often, the groups have independently evolved specialized and incompatible procedures and work practices. Correspondingly, separate software systems for data analysis and document management were adopted as discrete solutions. The dichotomy existing in both the information sources and work groups jeopardizes the common goal of regulatory approval.

To facilitate the integration and synchronization of all information, processes and work practices necessary for making better and faster decisions in the enterprise, aspects of the present invention are embodied in a common architecture. In a simplified representation, the knowledge of an enterprise may be represented in a document life cycle diagram such as that depicted in FIG. 1. For example, the enterprise document management system (EDMS) 20, the imaging management system 22 and the enterprise workflow system 24 are portions of an knowledge management system that are currently available as stand-alone systems. For example, Documentum™ and PC Docs™ provide document management systems, FileNet® has described imaging management and enterprise workflow solutions, and InConcert® workflow management software. In a preferred embodiment of the present invention, the system employed by the enterprise would not only enable portions 20, 22 and 24 of the enterprise-wide system to be integrated, but would further include the functionality represented by the knowledge integration portion 26.

In a preferred embodiment, the present invention would be implemented in one or more phases of complexity, each building on the functionality of the prior by adding more value and addressing a more complex facet of the knowledge integration problem. At a first or basic level, the DataDocket phase automates the process of transferring data analysis reports to a document management system for document production (e.g., regulatory approval submission), synchronizes information flow between a data repository and document repository (and respective documents therein), and provides linkages from the documents back to the data analysis software. Such a system also preferably captures metadata associated with the information shared, stored and accessed by the users of the data so as to characterize the "context" in which the information is being used. As depicted, for example in FIGS. 2A and 2B, the customer data analysis software application (e.g., SAS/PH-Clinical) 50 is separate and distinct from the enterprise document management system (e.g., Documentum or PC Docs) 55. There is no mechanism for communication of information between the two applications. In a simplified form, the communication may be implemented in a point-to-point system 60, where customized software is designed to provide for the transfer and incorporation of data from the database/analysis application 50 to the documents stored in the document repository software 55. Such a system is, however, of little value beyond solving the problem of communicating from one software application to another.

Figure 2A:
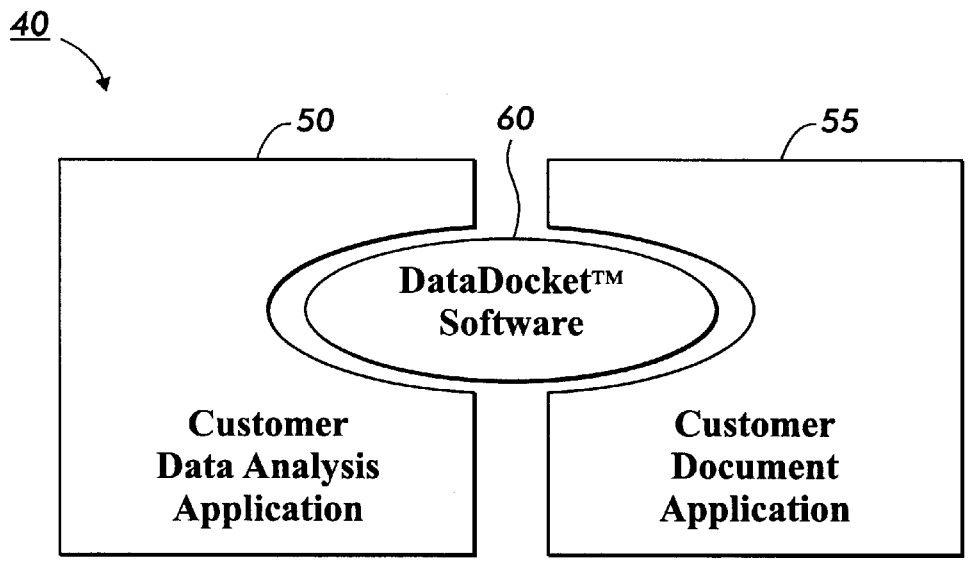
FIGS. 2A and 2B depict block diagrams representing those components of an embodiment of the present invention.
Figure 2B:
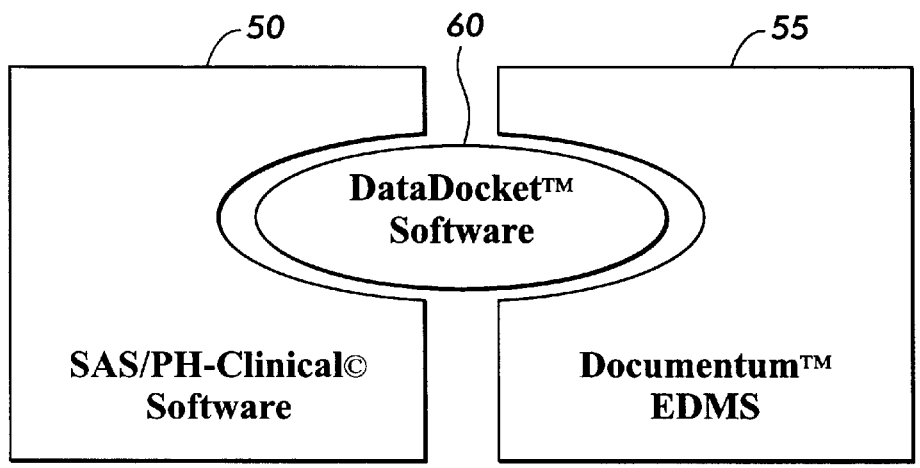
Figure 3:
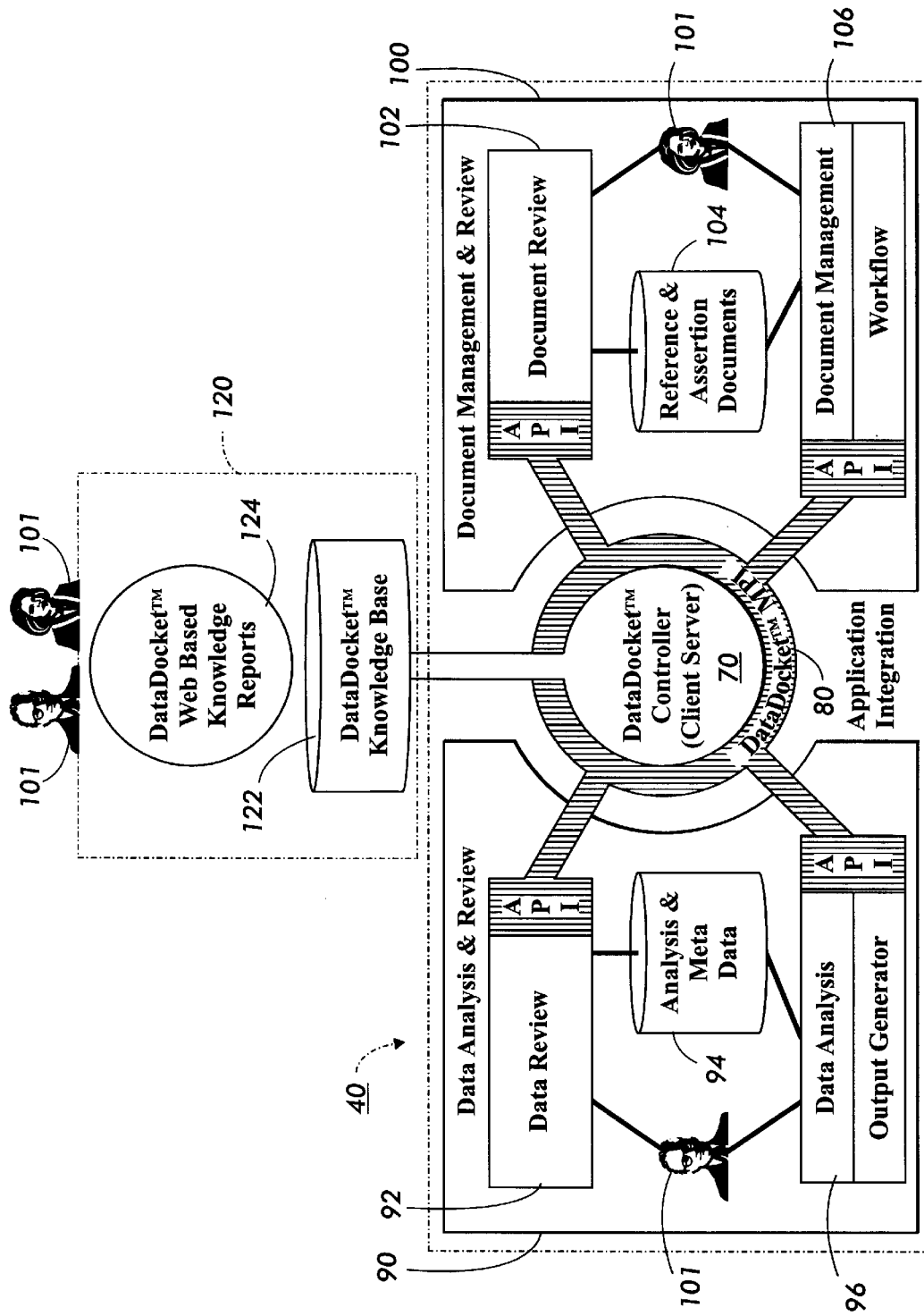
FIG. 3 is a detailed representation of the components necessary to implement a fully functional embodiment of the present invention.

The preferred DataDocket architecture, depicted in FIGS. 2A or 2B, is characterized by "middleware" 60 that manages the flow of information between two or more applications that comprise the information system of an enterprise. The software is preferably implemented as object oriented code (e.g., Visual C++ code) and may employ prototyped modules generated in Visual Basic. The software will run on a client server system (e.g., Windows NT) as depicted in FIG. 3 to provide web-based operability and users will operate PC client systems having Windows NT/95 operating system software. The functionality of the DataDocket phase includes:

(a) the integration of independent data analysis and document management software applications;

(b) menu-based selection or batch processing of commands;

(c) generation of an audit trail to represent the flow of data;

(d) versioning of analysis data;

(e) enabling linkage between data analysis software and EDMS;

(f) updating a knowledge base which stores dynamic information about integration transactions;

(g) enabling "live" links between objects in data analysis and document management systems;

(h) using stored context information, provides access to historical information about how a report was created, who did the work, and when it was completed; and (I) triggering workflow events as part of an integration transaction (e.g., email notification, rendition generation request, etc.). Advantages derivable from the Data-Docket phase include: improved information integration processes and practices; a reduction of the error rate typically encountered with manual processes, and an assurance of the quality of the work processes and practices—enabling better, faster business decisions, and easier access to both text and numerical information sources from a user's desktop.

The DataDocket architecture is depicted in more detail in FIG. 3, where the software components necessary to enable the functionality noted above are represented. In particular, the architecture is comprised of a series of interrelated software components. At the center of the architecture is the DD-Controller component 70 consisting of Client and Server subcomponents (DD-Client and DD-Server). The DataDocket Controller component controls communications and operations of all DataDocket components. It consists of a multi-threaded server with concurrently operating client software, DD-Server and DD-Client respectively. Design features/objects preferably will include: Maitre d-, Database Communicator, Workhorse, Client, Logger, Administrator, Socket Communicator, JobQueue, ClientMailer, Auditor, Job/Object Status, Transaction Feedback, synchronous/asynchronous operation modes, versioning, etc., the source code for which may be found in the attached Source Code Appendix.

For the client/server component 70 to interface with the various independent applications that may be linked by DataDocket, the system preferably employs a DataDocket application programming interface (API) 80. API 80 is responsible for communications external to the DD-Controller, enabling the integration between independent software applications (e.g., data analysis software and document management software).

As illustrated in FIG. 3 data analysis and review block 90 includes a data review subcomponent having access to the analysis results & meta data stored in database 94, and providing access to such information to the user 101. The analysis results, and output thereof, are provided by subcomponent 96, which processes the meta data stored in the database at the direction of the user 101. API 80 is employed as the means by which the data review, data analysis and output generation is initiated and controlled by the DD-Controller 70.

Similarly, the document management and review block 100 preferably contains a document review subcomponent 102, that enables a user 101 to review reference and assertion documents stored in the document database 104. The document management and workflow subcomponent 104 also interfaces to the document database 104 at the behest of the user to create, manage or update the documents. As with the data analysis and review functionality, the interface between the subcomponents of the document management and review block 100 and DD-Controller 70 are accomplished via API 80. Having described the general operation of the various components in the basic DataDocket embodiment, attention is now turned to characterizing the subcomponents in more detail.

The client subcomponent of DD-Controller 70 will operate concurrently with the DD-Server. The client subcomponent is characterized by the following pseudocode:

---

```
Client Startup Tasks (assumption: know username, whether from PHC or
command line), and the PHC send output directory. If being invoked for
real, know if job is batch.
Attempt to log on to the server [Verb: LogOn. Handoff area should come back
in the login reply]
    - check that it's alive
    - compatible versions of classes that are sent back/forth
    - if incompatible versions, present info and fail.
Check Msgs ( verb: GetMsgList )
    If not batch then, show any pending, unread msgs to the user.
Ideally, don't block job processing
while reading.
Check that root file [handoff_area] area matches where server is looking,
and being used . . . convert to UNC
naming convnetions to avoid drive mapping.
Read job file
Protect files (by rename/move) from SAS overwrite
(update file paths in job directions, send to server)
>> how?
```

-continued

```
Try to send job (verb: QueueJob)
If not accepted:
    If interactive, show queue status message. [In reply, server should give status of queue.
Example:     "Documentum down for a backup"]
    Else (batch) Send mail to user with queue status message.
    WriteSasLog ( "queue not accepting"), quit.
Sync/Async issues:
Sync: track job status . . . show progress [Try to show context/summary info to identify the job specifics (if
possible) [Use date/time for Oct. 31]]
    - get 'stillAlive' pings from server.
    - If not frequent enough, WriteSasLog ("serverDied") and quit
    - Incoming message: jobHasMoved status_inQUeue
    - jobHasMoved status_inQUeue
    - jobHasMoved status_inProcess
    - Accept user input
        - Read messages, if any.
        - Cancel button
            - If clicked, send RequestCancel to server
- Completion:
    - Incoming message: Get job status with status_done
        - Send GetSASLogFile (jobID) msg to server, returns SAS log
        - If not batch, maybe show log to user
        - Query DB to construct SASLog file. Write and exit program
        - Send ClientQuitting
Msgs received by Client
CmailBox {
    CmailBox ( int myID ); // pass user id of owner.
    CMsg *GetMsg ( int msgID );
    BOOL HaveUnread();
    BOOL MarkAsRead ( CMsg *theMsg ); // should check that users match?
Private:
Int m_myID;
};
Menu Items
Preferences
- Set IP address for server
Config
IP for server
```

Similarly, the server subcomponent of DD-Controller 70 operates in accordance with the following pseudocode, and preferably includes the Admin, Workhorse, Maitre d- functionality that is characterized in the attached Source Code Appendix:

```
Server Startup
? Admin: make a service?
MD [Instance vars: WH list, Queue status, User List, Cdatabase m_db;]:
Single Instance on a machine: exit quickly if there's already a copy
running.
Connect to DB
    SCREAM LOUDLY if that's not possible -- (how?)
Load configuration info
    - quit if machine IP address doesn't match tbCOnfig. Server_IP
Preflight
    - file_root area visible accessible
        - if can't connect, send mail msg to admin (high priority)
Startup:
Start Workhorses
For (max_workhorses) { WHTable.LaunchNewWH }. Assume that .exe is called
"DDWork.exe" in same
folder as MD .exe.
Build Job Queue
    Query DB for jobs of status "preparing". Set them back to status of
"pending". Send admin a msg       that the job was aborted, and is being
restarted.
    Query DB for jobs of status "inwork". Send admin a msg that the job
was aborted, and is being         restarted (and at which output object).
    Query DB for pending jobs (order by job id). Build list in memory.
Send JobHasMoved msg to
        any logged in users to reestablish connection / status.
    - Accept incoming msgs:
        - Login [NB: user can be logged onto 2 different PC's at the same time.] :
            - If user isn't already logged in, allow the
login . . . record IP address. [DISC]
```

```
                    - Compare versions of classes
                    - Send reply with success / failure. (send queue status
also?)
                    - If user has jobs in process, send JobHasMoved for them.
            - GetSASLogFile [jobID] [Need to monitor time taken to process these requests.]
                    - build log file. Return text, and
                    - int errCount;
                    - BOOL foundJobID;
                    - Cstring logFileText;
            - RequestCancel [jobID]
                    - If job[jobID] is found, and has status of pending . . .
                            - BEGIN_MUTEX(job).
                            - Set Status to Cancel, committing to DB
                            - Remove from Job Queue in memory
                            - Delete {JobInfo} and SAS Files // Should be a
subroutine call
                            - END_MUTEX
                            - RefreshJobStatus(); // sends JobHasMoved to
clients in line.
            - QueueJob [Note: should watch how long this takes . . . need to be careful that is doesn't tie up the CPU
and       block incoming client requests.]
                    - Associated class: CJobInfo
                    - If no errors, and queue is accepting job
                            - Put into list in memory, and update DB creating a
JobQueue entry.
                            - Create {JobInfo} file (Carchive) from parsed job
data. Save to a            'temp' file, put
                    into JobQueue record.
                            - Return JobID to client
                    - Else
                            - Return error code / string to client.
            - WH messages:
                    - StillAlive
                            - Set Whtable [procID].lastAlive = time
        - Idle loop
                - If Wh [x] died, requeue its job.
                - Restart WH's if needed
                    - If WHTable.LiveSessions() < Max_workhorses ]
                        - WHTable.LaunchNewWH
        - Methods available to WH:
                - PeekNextQueueItem()
                    - May return a job with status of pending, or InProcess.
                - SetJobStatus ( jobID, newStatus [Preparing/inwork/done] )
                    - Change JobQueue.Status in DB
                    - Triggers JobMoved Messages to be sent
                    - Shouldn't assume that it's the first, if multiple wh's
WH [2 threads: 2nd one has job of sending 'still alive' to MD every 10 seconds]:
    Connect to MD (could be on another machine).
    Connect to DB
        - read config for docbase / target folder info
    - Preflight:
    - verify DCTM connectivity
            - > could send msg to admin
            - if you can't connect, try again after tbConfig. EDMS_Retry
seconds.
        - connect to DocBase as DDWriter
            - create output folders if necessary
            - verify that they can be found / created
        -
    - Main Processing LOOP
            - BeginTrans [Important: don't change status to in process until/unless OutputQueue objects have
been    created, and the {JobInfo} file has been deleted]
                - Look at front job in Queue, with MD. PeekNextQueueItem
().
                - MD.SetJobStatus (id,preparing)
                - BEGIN_MUTEX(job). // we're working on the job, and may
change its status.       This blocks anyone else from touching
it.
                - If ( status == pending [Job may have already been InWork, and DB records
created] )           {
                Data Members:
                Cdatabase m_db;
                - Create OutputQueue objects for the job from {JobInfo}
file
                    - mark all as pending. There's a transaction around
all OO objects if           the process fails.
                -
                - MD. SetJobStatus ( InWork )
                - }
```

-continued

```
            - END_MUTEX
        - EndTrans
        - CUserInfo ActiveClient (job.UserID); // may not be logged on,
or may be at >1 PC.
        - LOOP over OO's in ActiveJob
            - For each output object:
                - If HasBeenSent(Source_Object_ID) // no
versioning, so don't send         twice.
                    - Next OO
                - BeginTrans
                    - LOOP over files
                        Check file into DocBase
                    ENDLOOP
                    Update OO.Status field
                    Populate OO.Destination (
                    Check log files into docbase
                    Attach audit info
                EndTrans
            - MD.SendMsg (ActiveClientJob,JobHasMoved). // ignore
comm error
        - ENDLOOP // ActiveJob
        - Post CMailMsg to client, telling them that the job has been
completed.
        - MD.SendMsg (ActiveClientJob, PostedMsg )
        - Delete {JobInfo} file
        - Delete SAS Content files (always, even if errors / cancel )
            - MD.SetJobStatus (status_done) [Will send a JobHasMoved msg to client]
// ignore comm        error
        -
    - Ping Thread
        - If (time_elapsed > 10 secs) MD.StillAlive (processID)
        - Ping Active Client . . . let them know we're alive.
```

The following pseudocode represents an implementation of the client/server model without separating the client from the server. In other words, the pseudocode is written with a client and server in mind—and appropriately abstracted—however, they may reside in the same executable and may be run from the client PC. In a preferred embodiment, these object sets would be split apart.

```
Config Info Needed
    In Registry/INI
            DB_Path          DB location
            Max_workhorses   Max # of workhorses
    In DB
            Target docbase
            [handoff_area] Root folder for passing off files (UNC conventions)
??
            password for signing into DCTM
Server Menu Functions:
    Broadcast Message
            Asks for a message . . . sends it to all users
    Queue Status
            Allows Setting Queue Status to either:
                    () Accept New Jobs
                    () No New Jobs
Choose Docbase [And choose destination folder. Must have DDWRiter account set up. May have work to do to set up
formats, and prepare docbase.]
        - only allow if WH's aren't running
    Kill Workhorses-
    Preferences
        Root Folder
                pick folder used to hand off stuff from PHC.
                Shouldn't be changeable if workhorses are going, or users are logged on.
    Job Statuses
    Pending
        Job description is in {JobInfo} file
        OutputQueue Records haven't been created
    Preparing
        Begin Trans
        Creates DB Records
```

-continued

```
EndTrans
    Deletes {JobInfo} file
InWork
Done
```

As previously described, the DD-Application Programming Interface (API) is responsible for communications external to the DD-Controller, enabling the integration between a plurality of independent software applications (e.g., data analysis software and document management software).

Also depicted in FIG. 3 is a knowledge management block or level 120. Knowledge management level 120 includes DataDocket Knowledge Base (DD-KB) 122, a specialized database within the DataDocket Architecture that is designed to capture knowledge by storing information necessary to identify, "live" link, track, and record all transactions associated with business processes and work practices, as well as other functionality that might be enabled in a second or more advanced embodiment of the basic DataDocket system. Knowledge management level 120 also includes DataDocket Web-Based Knowledge Reporter (DD-KRPT) 124, a component that will preferably enable queries and reporting of information managed in the DataDocket KnowledgeBase via a web browser interface.

Figure 4:
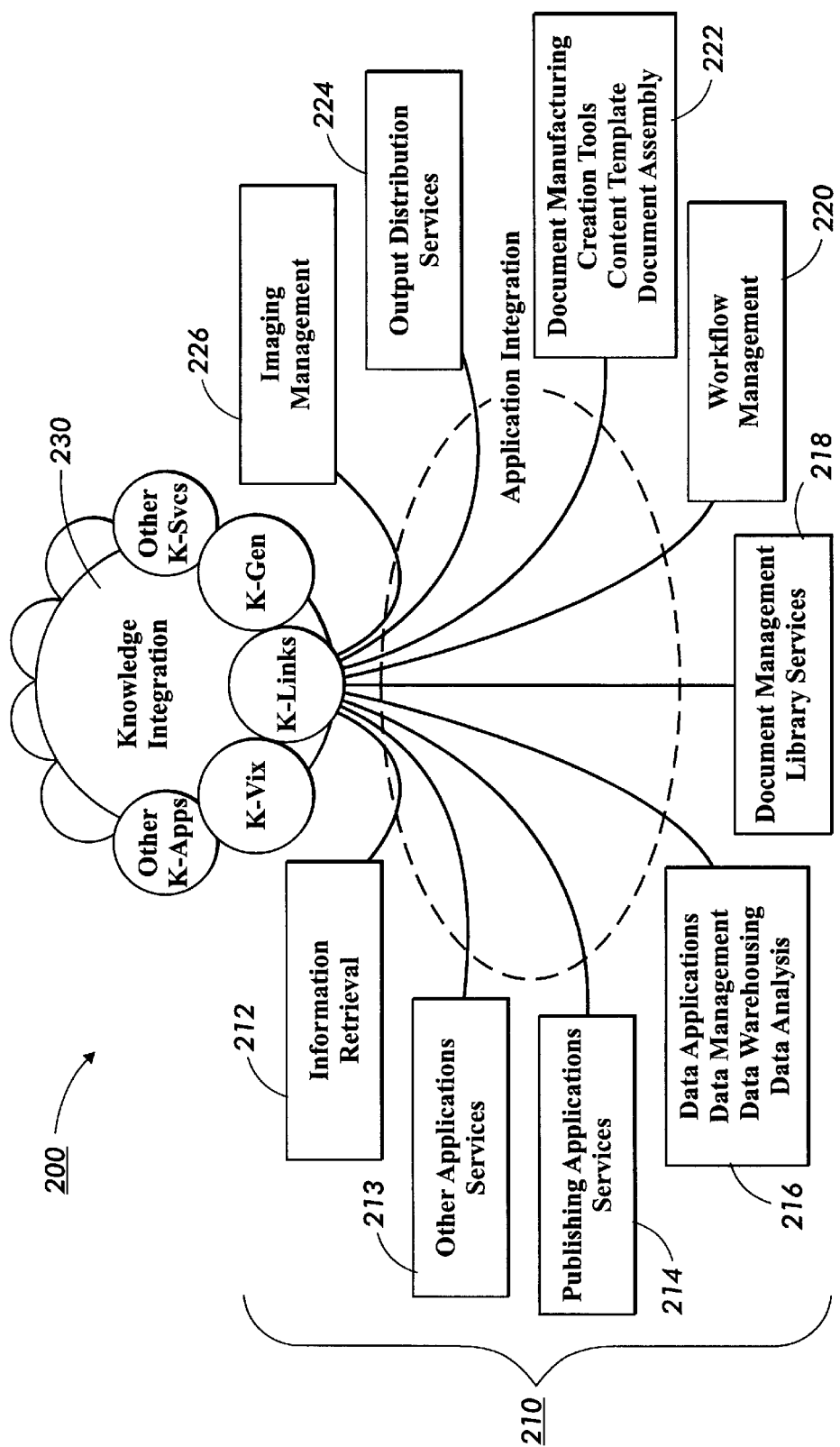
FIG. 4 is a depiction of the general architecture of a knowledge integration system in accordance with aspects of the present invention.

Turning next to FIG. 4, depicted therein is a generalized three-dimensional view of a knowledge integration system 200. In particular, system 200 is able to integrate the operation of a series of information related applications 210, including: information retrieval 212, other appliciations/services 213, publishing applications and services 214, data applications (management, warehousing, analysis) 216, document management and library services 218, workflow management 220, document manufacturing creation tools (including content templates and document assembly) 222, output and distribution services 224, and imaging management 226. At a higher level, beyond that of integrating the various information related applications, the system integrates the knowledge contained in the respective applications, as represented by the knowledge integration sphere 230. Similarly, once the integrated knowledge is obtained, additional functionality, examples of which are generally characterized below, may be added to the system.

Figure 5:
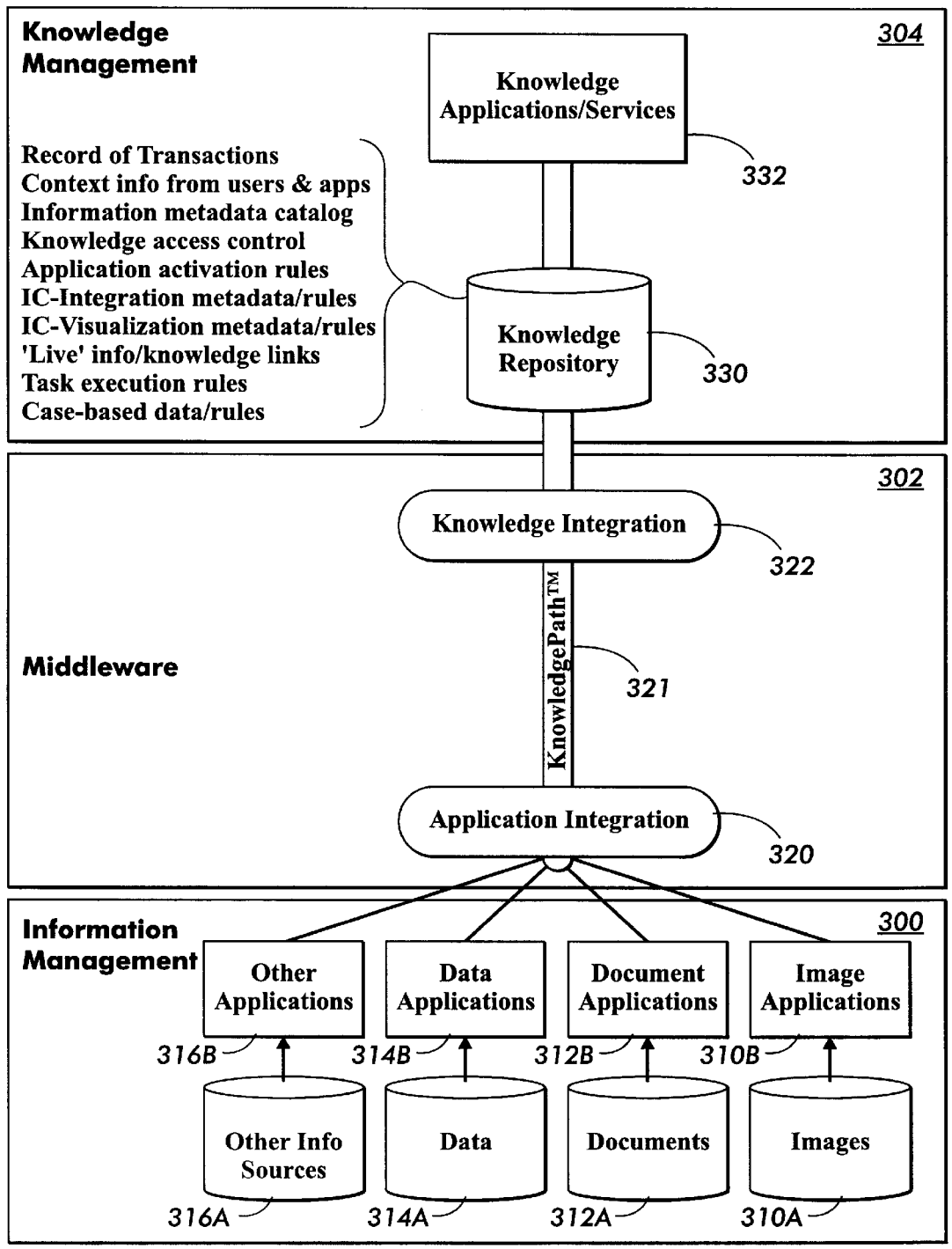
FIG. 5 is a representation of the hierarchical levels of software in one embodiment of the knowledge integration system depicted in FIG. 4.

Referring also to FIG. 5, illustrated is an upper level software architecture for the knowledge integration system 200 of FIG. 4. In the architecture of FIG. 5, the system has been divided into 3 distinct software levels—information management 300, middleware 302 and knowledge management 304. Within information management level 300 reside the plurality of independent information management applications controlled by the DataDocket system, for example, image data and associated image applications (reference numerals 310A, 310B).

As previously described, the DataDocket system employs an API layer (not shown) to interface to and between these various information management applications in level 300. The API, and the DD-Controller component that controls the functionality of the API, are generally characterized as middleware 321—falling into level 302. The functionality enabled by the middleware 321, not only enables the integration of the functionality of the various information management applications (application integration, 320), but also provides added resources so as to monitor the flow of information into, out of, and amongst the various information management applications (knowledge integration, 322). The knowledge integration block 322, in turn, provides input and receives instructions from, the knowledge management level 304 via knowledge repository 330.

As inputs, the knowledge integration block supplies records of transactions, context information from users and applications, and information to populate an information metadata catalog in the knowledge repository 330. The knowledge applications/services are a potentially broad range of features that enable the efficient use and extraction of the integrated knowledge residing in the system. For example, the "KnowledgeLink (K-Link)" feature embeds and executes "live" knowledge links stored in documents and analysis data. Users will be able to define and execute multiple tasks to be performed by one or more information management (data or document) applications from anywhere within the actual information content. More specifically, a knowledge link may be specified from within either a source document or published document, linking back to a related object in the data analysis system. Any source document links (defined at anchors within document content; i.e., at a specific place on a page) will be preserved when the document is published into a particular format (e.g., Adobe® PDF). The user would then have the ability to invoke a knowledge link, thereby accessing information within the knowledge repository and elicit a defined set of tasks that may initiate a set of transactions with assorted applications.

The "KnowledgeViz" (K-Viz) feature would enable a user to visualize objects and linkages maintained in the integration knowledge base, using a three dimensional interface and conceptual schema for access and manipulation of enterprise information wherever it is stored and managed. In particular, the knowledge visualization vehicle will provide a graphical front end to the knowledge management system described herein and enable the exploration, access, and use of knowledge via a user-specific taxonomy/classification hierarchy. For example, it may be employed to create a familiar regulatory environment, using a 3-D workspace, containing all of the data and information repositories (statistical data, documents, images, etc.), their buildings, people, regulatory submission objects/products, printers, etc. for simulation and real-time status of those objects and linkages between them. Examples of such visualization vehicles are currently described as product offerings from InXight, Inc., and include Hyperbolic Tree, Perspective Wall, Table Lens and Cone Tree. Additionally, the "KnowlegeGen" (K-Gen) feature would generate knowledge documents used to manage the regulatory marketing application process. A rule-based approach would be used, enabling specification of hypotheses, assertions and explanations consisting of structured and unstructured data.

The preferred embodiment would be an integrated system and framework for assisting "regulatory" knowledge workers who are responsible for making and supporting conclusions based on a complete and synchronized set of information sources. Implementation of such a framework necessarily includes tools that, as described above, provide: a mechanism to automatically build an integration knowledge base; augment an integration knowledge base based on user-specified linkages useful for processing information in support of analysis and decision making; graphically represent the integration knowledge base; and enable the construction of a regulatory proof (a logical argument based on assertions that support some hypotheses—the goal is to help clarify the "reasoning" used to reach the conclusion—and should be useful throughout the knowledge generation lifecycle by enabling identification of the existence or lack of supporting data, contradictory data, and facilitating exploration on the impact of new data). A further enhancement to such a system could include a mechanism for identifying information with highest significance for evaluation, whereby automated "agents", under a knowledge worker's control, continuously review and scrutinize the integration knowledge base for trends, anomalies, linkages, etc. Such a system would enable a comparison of new data to previous information and arguments.

The features and functionality in the architecture described herein are preferably integrated to allow the knowledge worker to interact smoothly between tools so as not to impact the efficiency of the integrated analysis and decision making process. Vital to the design and implementation of the mechanisms specified in this architecture is the capturing of the "knowledge path" of all the work required as part of building the proof for filing a regulatory application. Ultimately, anyone reviewing the proof should be able to retrace all steps taken from the finished application, back to the generation of the arguments and assertions made during analysis, and finally back to the original data. Accordingly, the capturing of the context for all transactions supporting the decisions made is essential. Such functionality is likely to require recording a textual account of the transaction—such as a knowledge worker indicating "why" they are doing something. However, whenever possible, the recording of information should be done electronically, automatically, with dynamic (or "live") linkages to the source information and the system that manages such information. As an example, when related publications, managed by an electronic literature indexing and distribution system, are used as part of a particular decision process in support of some assertion, then the items referenced from this system should be uniquely identified, including how to retrieve them from the system. Also of importance is one of the primary goals of the system described herein—to enable knowledge workers to base their conclusions on a more complete set of information from all sources.

Figure 6:
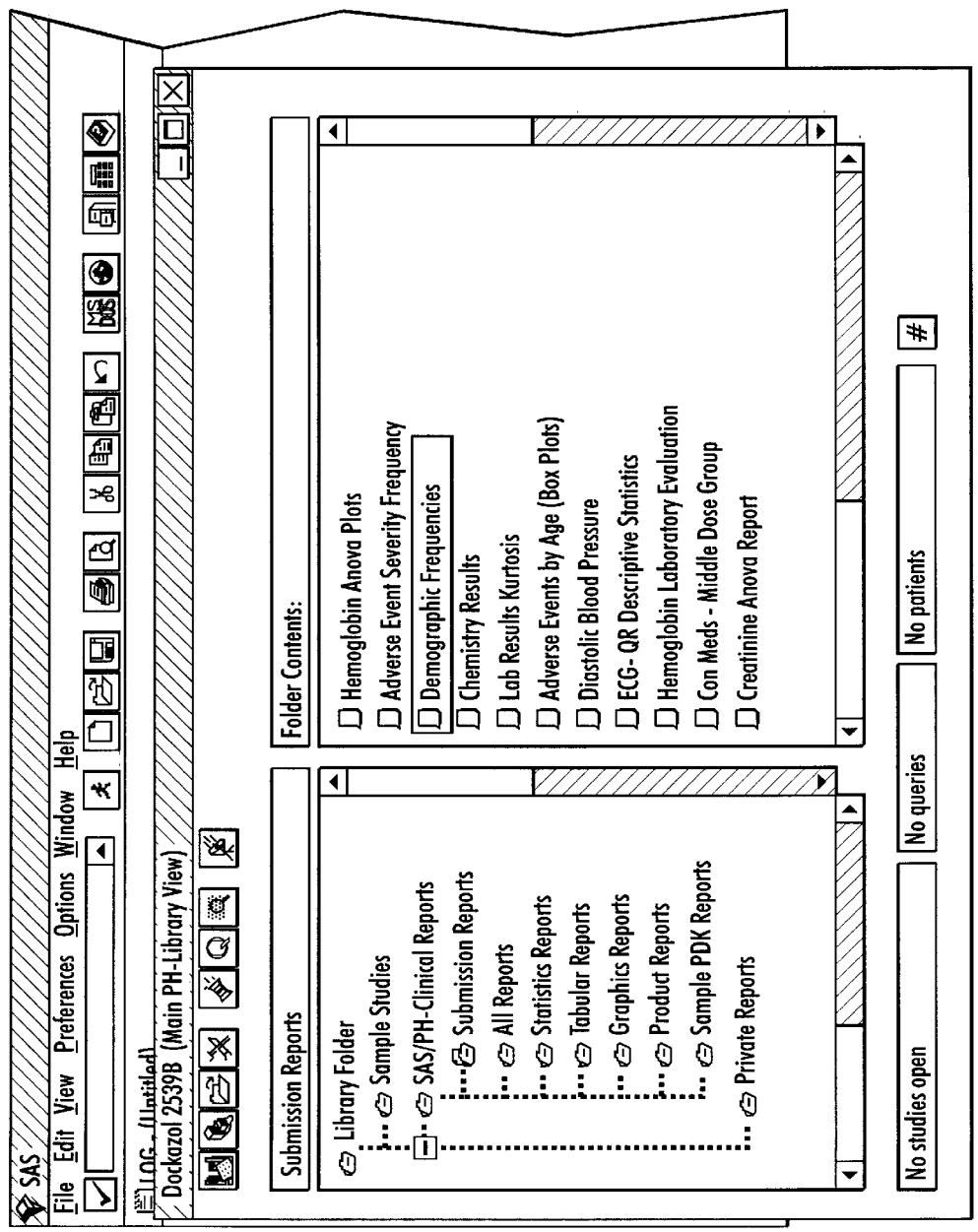
Figure 7:
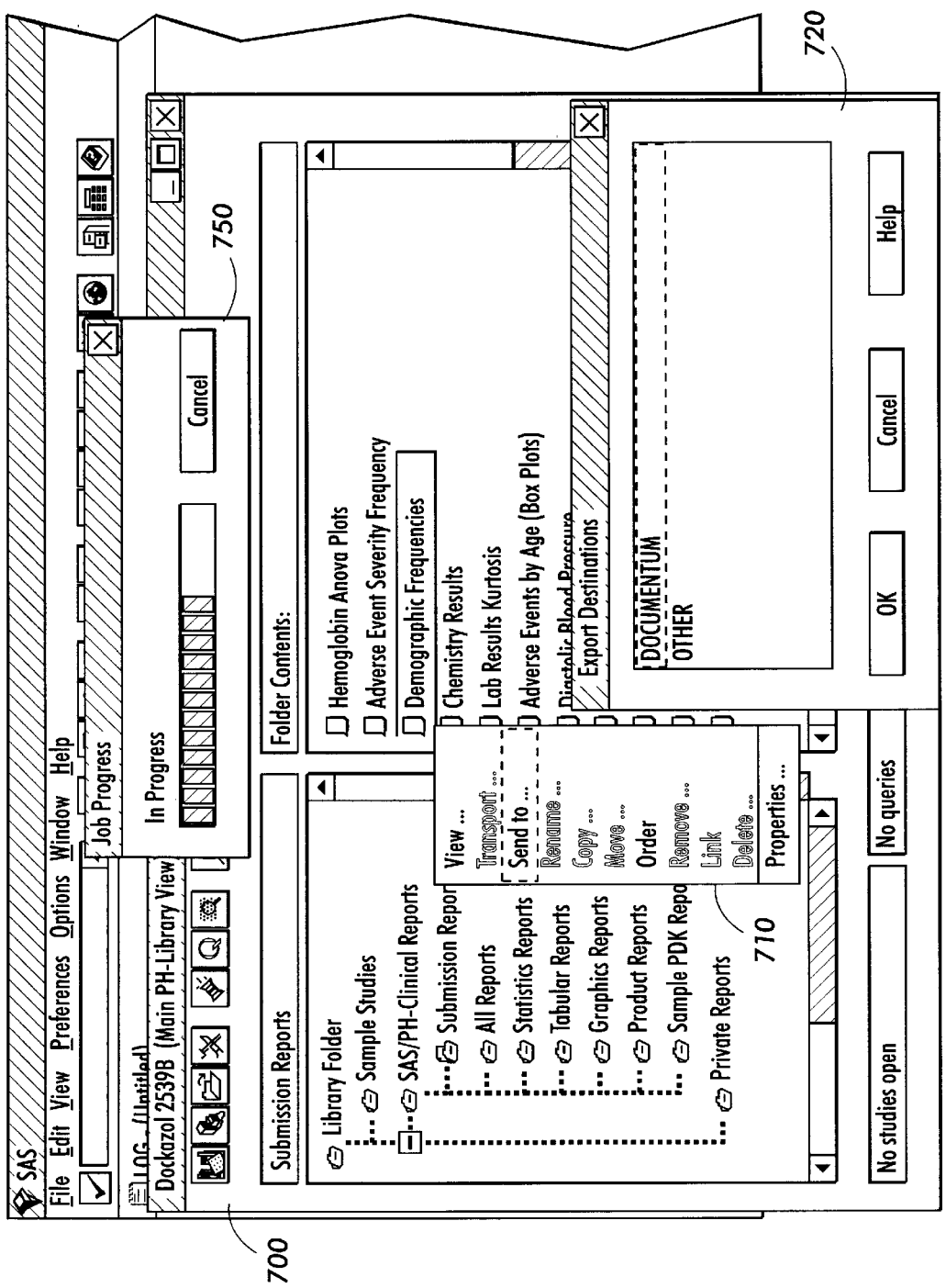
Figure 8:
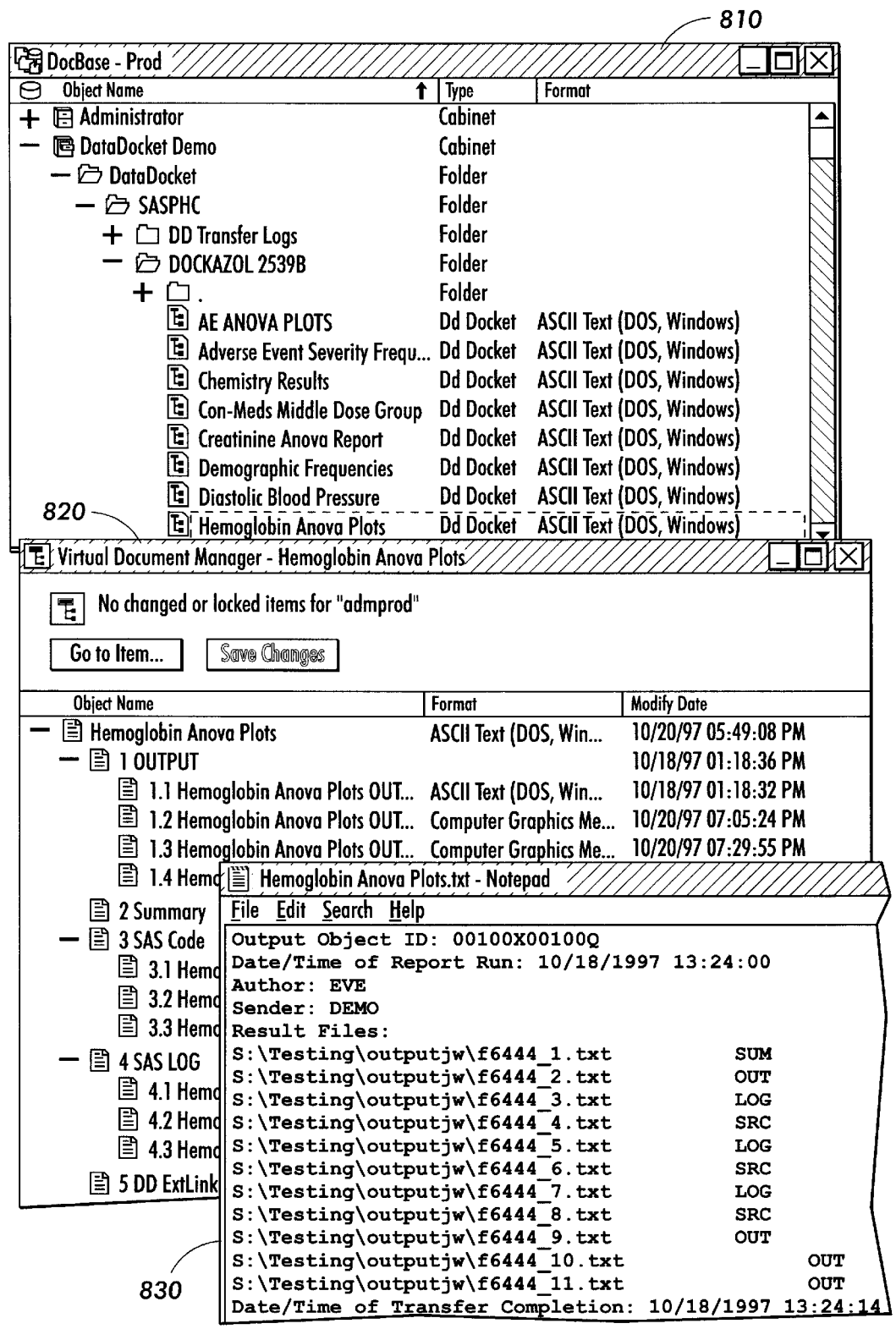

Referring next to the various illustrative user-interface screen representations found in FIG. 6 through 17, a narrative description of various aspects of an embodiment of the DataDocket system will be presented. One feature of the present invention is the automated exportation of analysis output to an EDMS. FIG. 6 is a representation of the user interface for an exemplary system employing SAS/PH-Clinical™ software for managing clinical data. In particular, the figure shows the folder structure of data and reports managed for an imaginary drug "Dockazol". Along the left of the window are the various submission reports, and along the right column are the contents of a particular folder, all displayed in a MS-Windows® based environment as is proposed for the SAS/PH-Clinical software environment. The transfer of analysis data from the SAS/PH-Clinical database or repository is initiated upon selection of the "Send to . . . " option displayed in pop-up window 710. Upon selection of the "Send to . . . " option 712, window 720 is opened to indicate the desired destination for the exported analytical data. Selection of the "Send to . . . " option invokes the DD-API as characterized above, to initiate the transfer. The transfer is monitored to ensure a successful transaction and progress is displayed via the bar chart in a progress box 750. Once completed, the information exported can be found in the Documentum™ workspace results illustrated in FIG. 8 (e.g., DocBase 810); particularly the Virtual Document Manager folder, 820.

Figure 9:
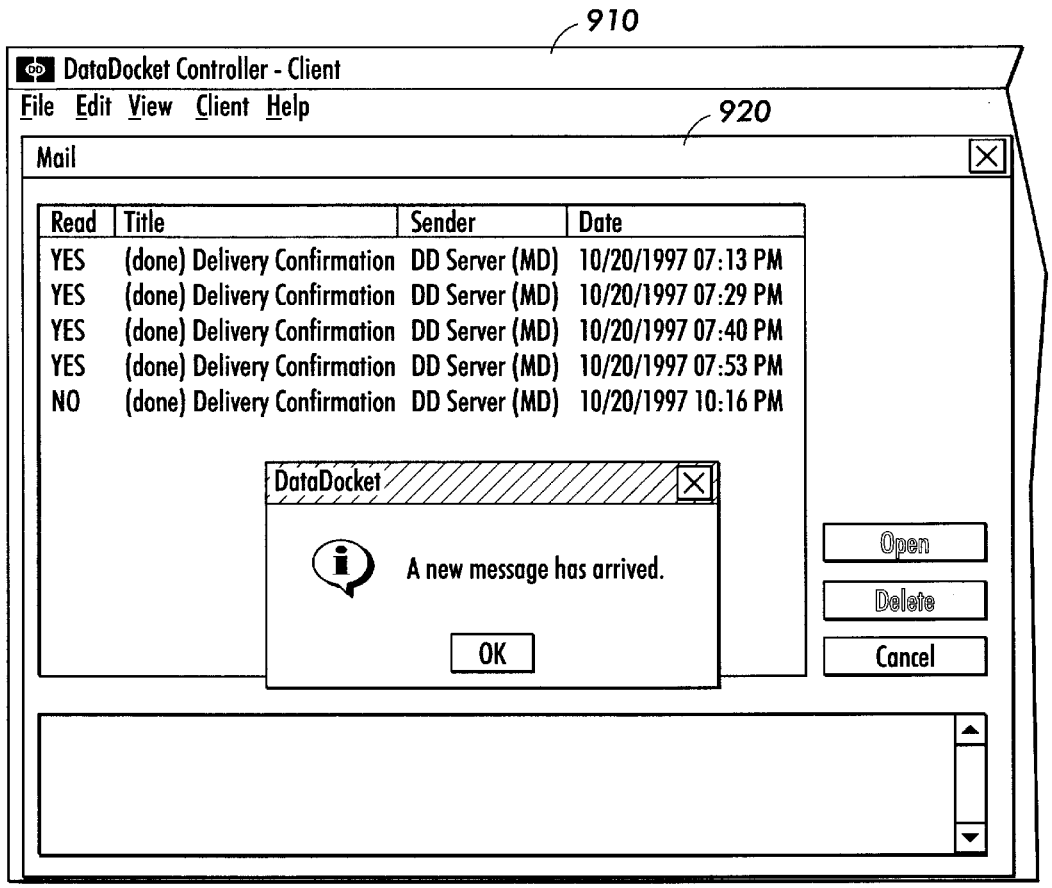
Figure 10:
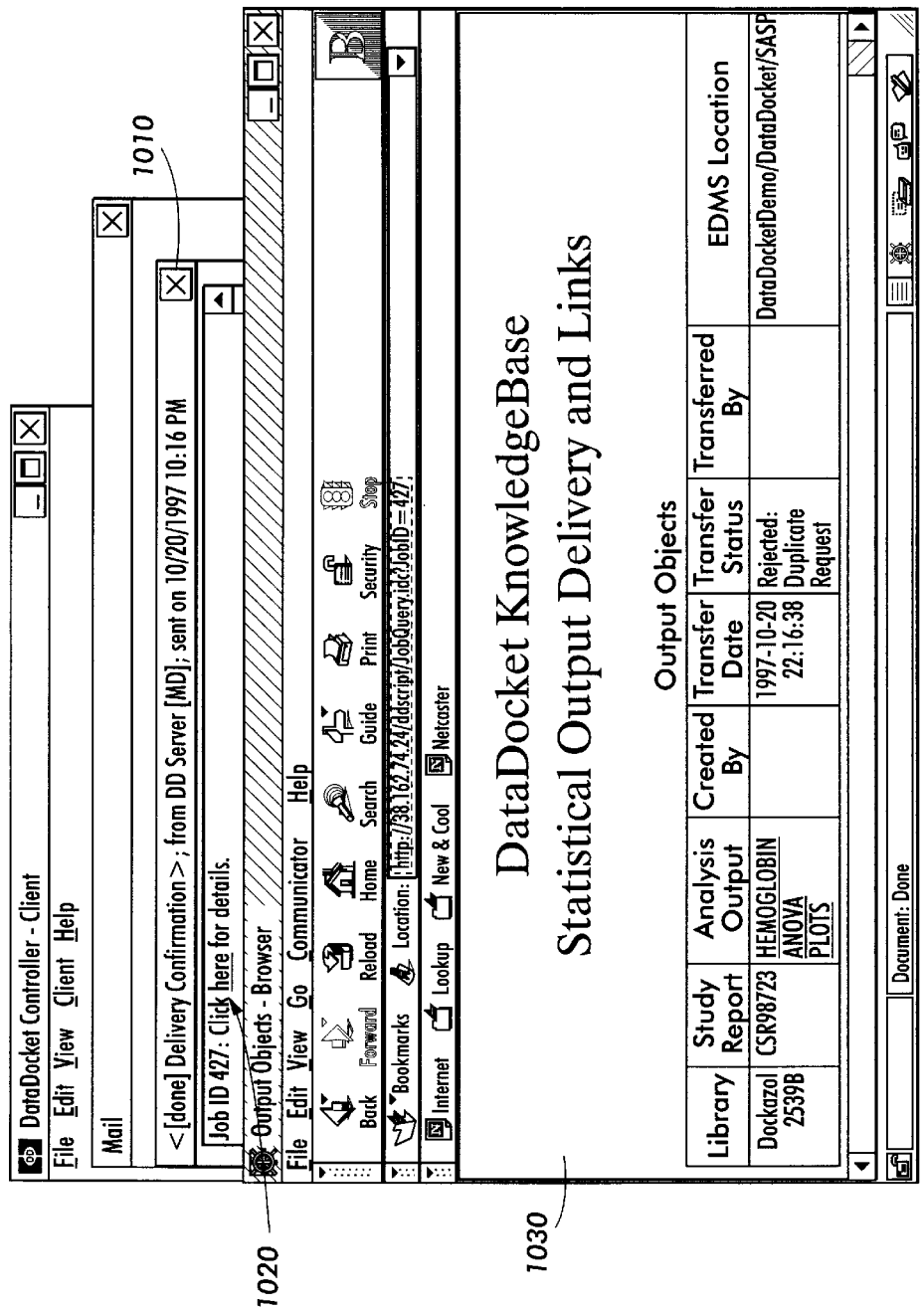

Another aspect of the present invention is the ability to trigger workflow events. For example, illustrated in FIG. 9 is a DataDocket Controller status window 910, showing the status of mail in sub-window 920, and a notification window 930 that provides the user with an indication that an email transaction has completed. As represented in FIG. 10, the user may also query the status of the job by selecting a link 1020 in confirmation window 1010. Once the link is selected by the user, browser window 1030 is opened to display the status of the transfer (e.g., completed).

Figure 11:
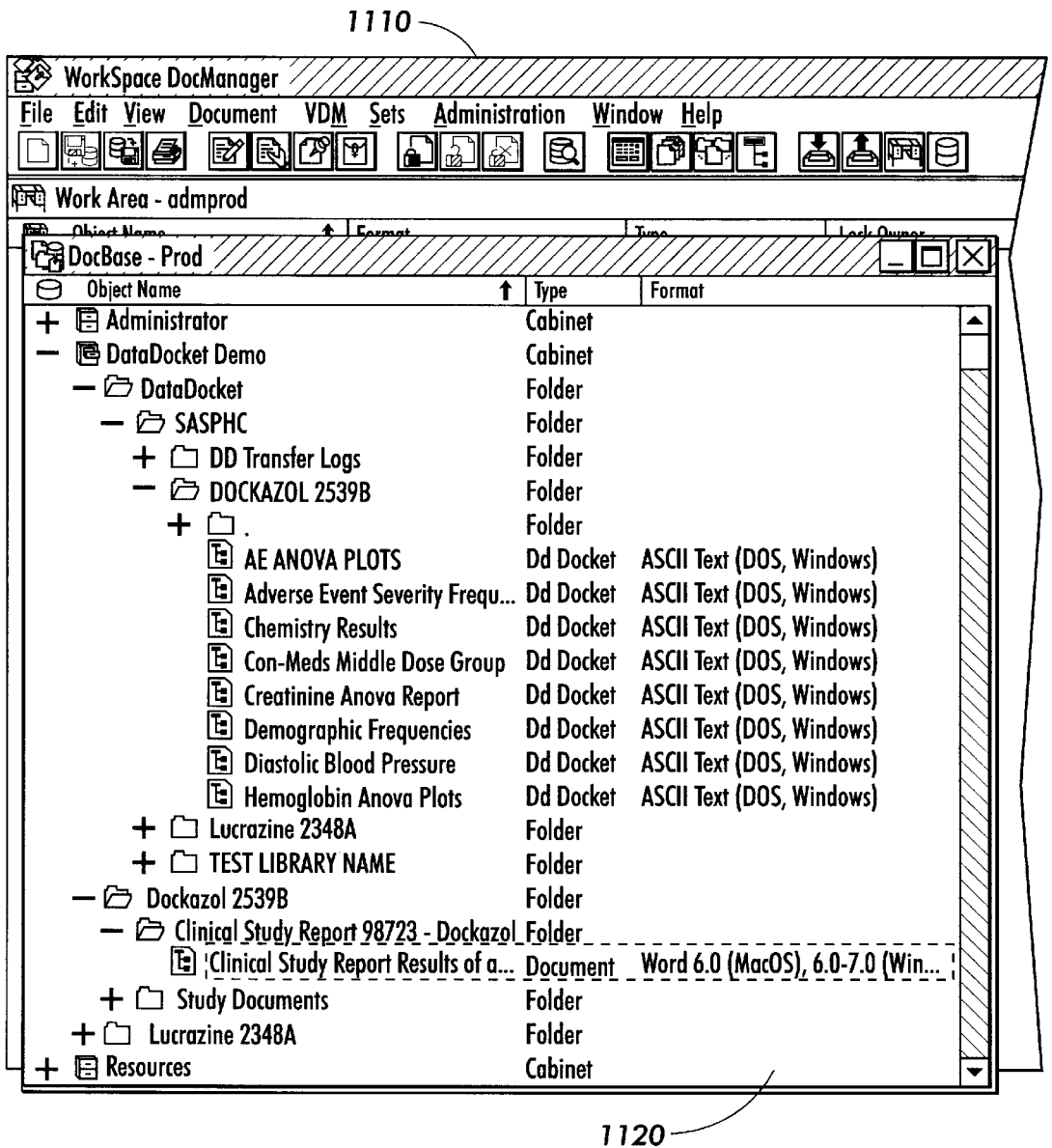

Referring next to FIG. 11, displayed therein is a portion of the workspace document manager window 1110, showing within it the document database window 1120. As indicated by the highlighted text, a user may use the analysis output to build reports. For example, selecting the highlighted entry results in the display of the Virtual Document Manager window 1210 in FIG. 12.

Figure 13:
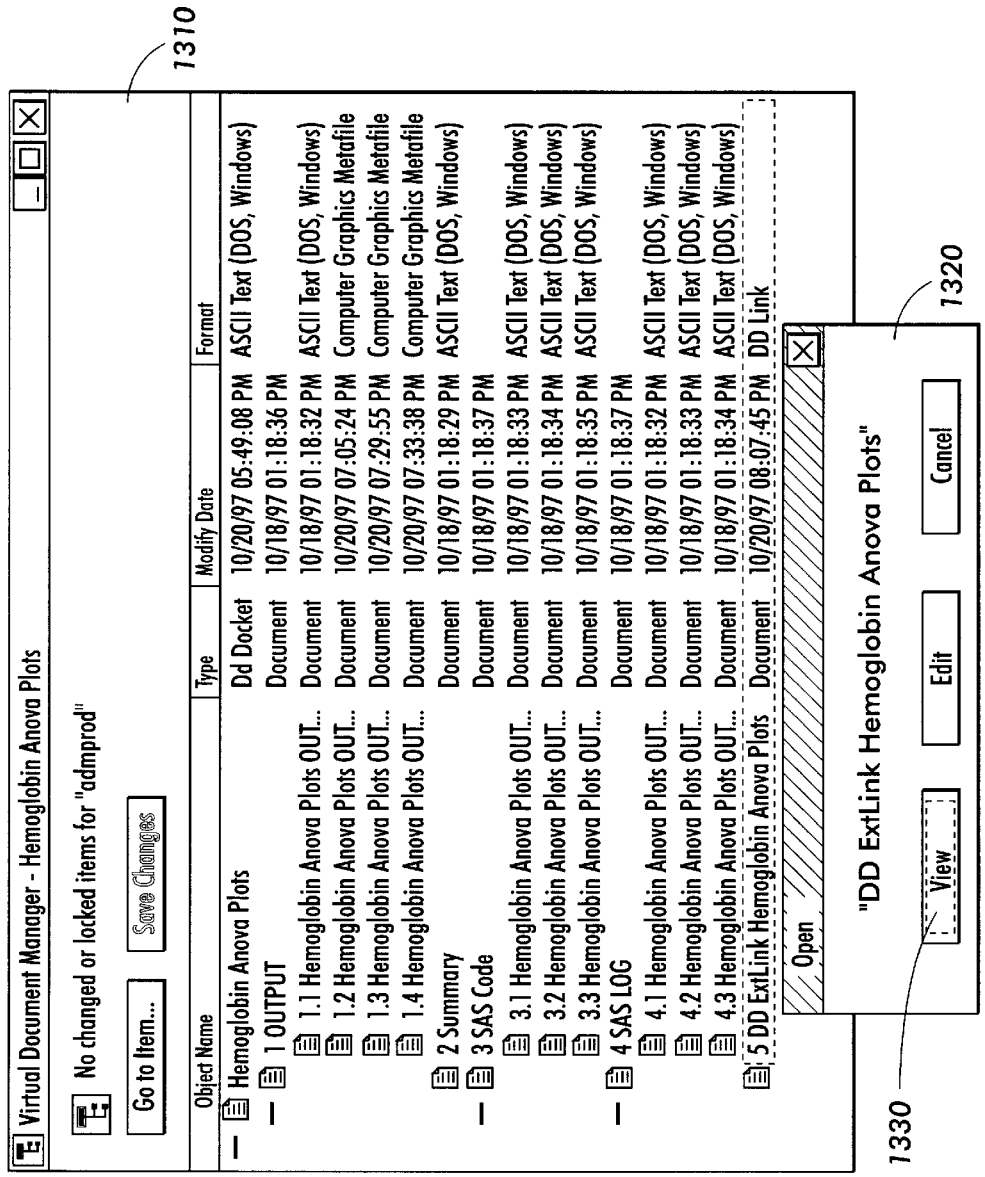
Figure 14:
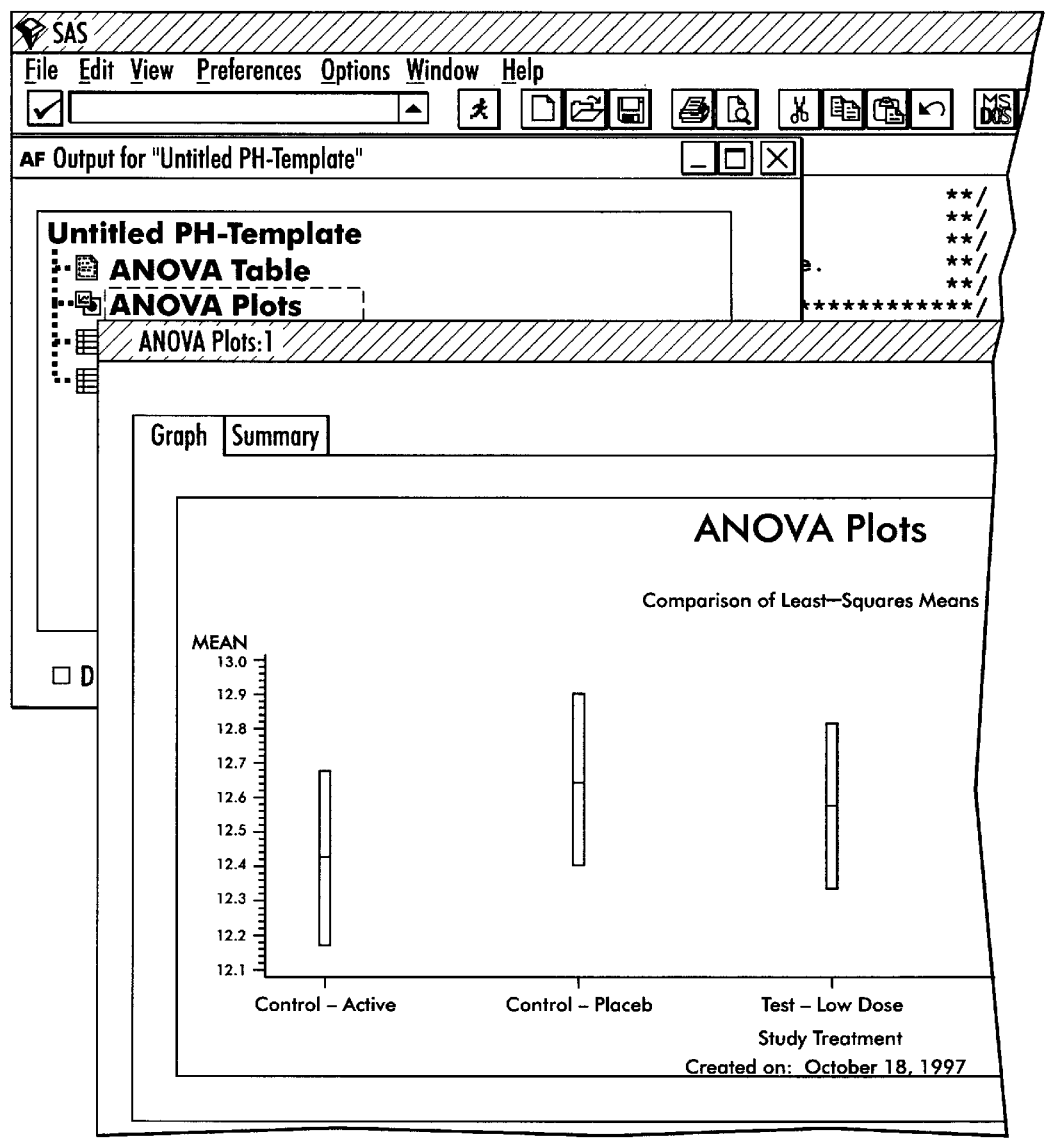

Another aspect of the present invention is the establishment of dynamic links from documents back to the data analysis system. For example, as illustrated by FIG. 13, a user may, from the Documentum EDMS interface, drill down into the supporting source data. More specifically, a user may, by double-clicking to select the highlighted object in Virtual Document Manager window 1310, initiate the option of viewing the selected object. If the "view" button 1330 is selected in window 1320, the object is displayed by linking to the analysis database and invoking, in one embodiment, the SAS/PH-Clinical environment, where the Anova plots can be displayed as shown by FIG. 14. Similar functionality can be enabled from a web-based environment through a browser window 1510 as illustrated in FIG. 15. Moreover, certain of the references may include further links to other data, for example, the location 1520.

Figure 16:
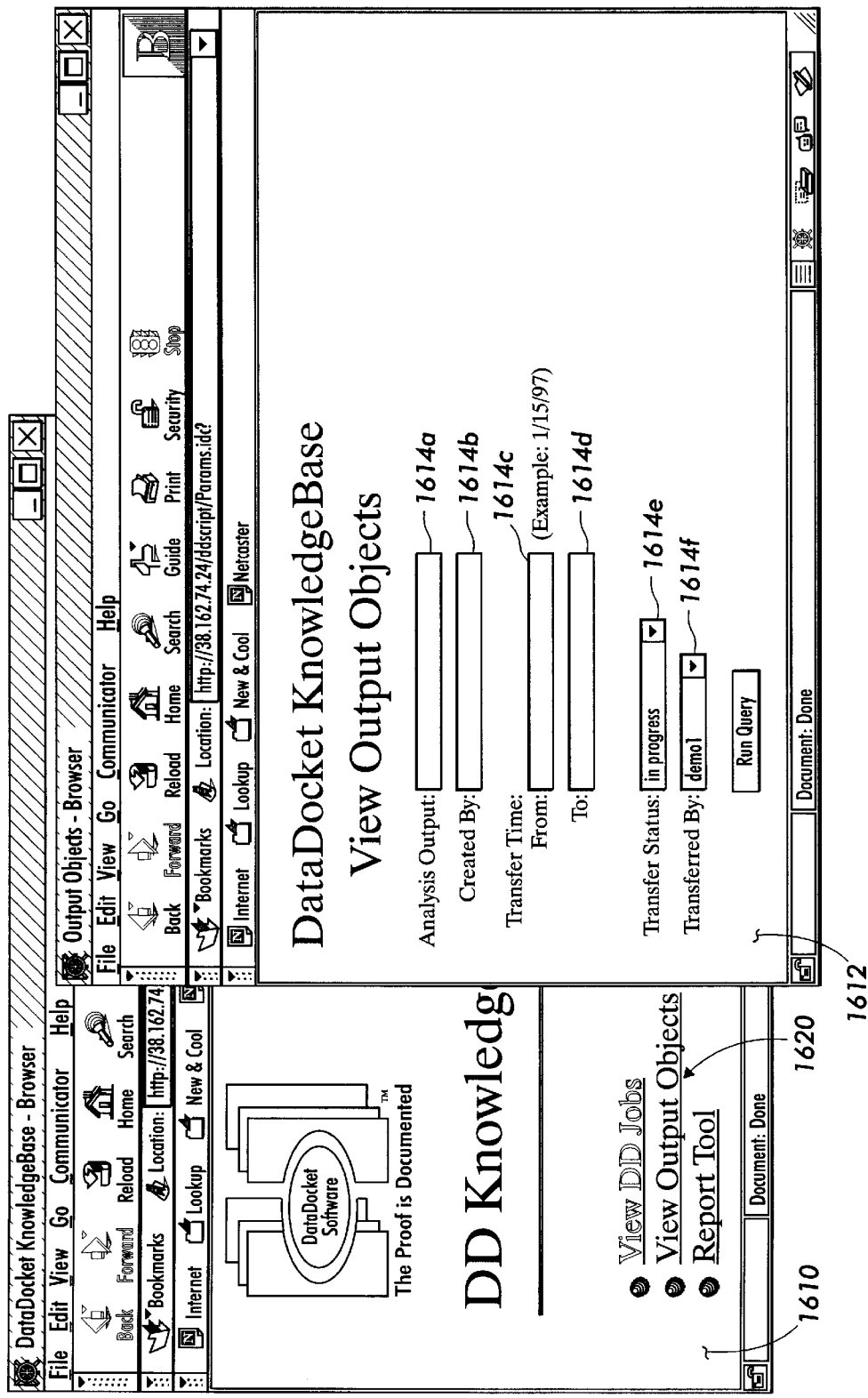
Figure 17:
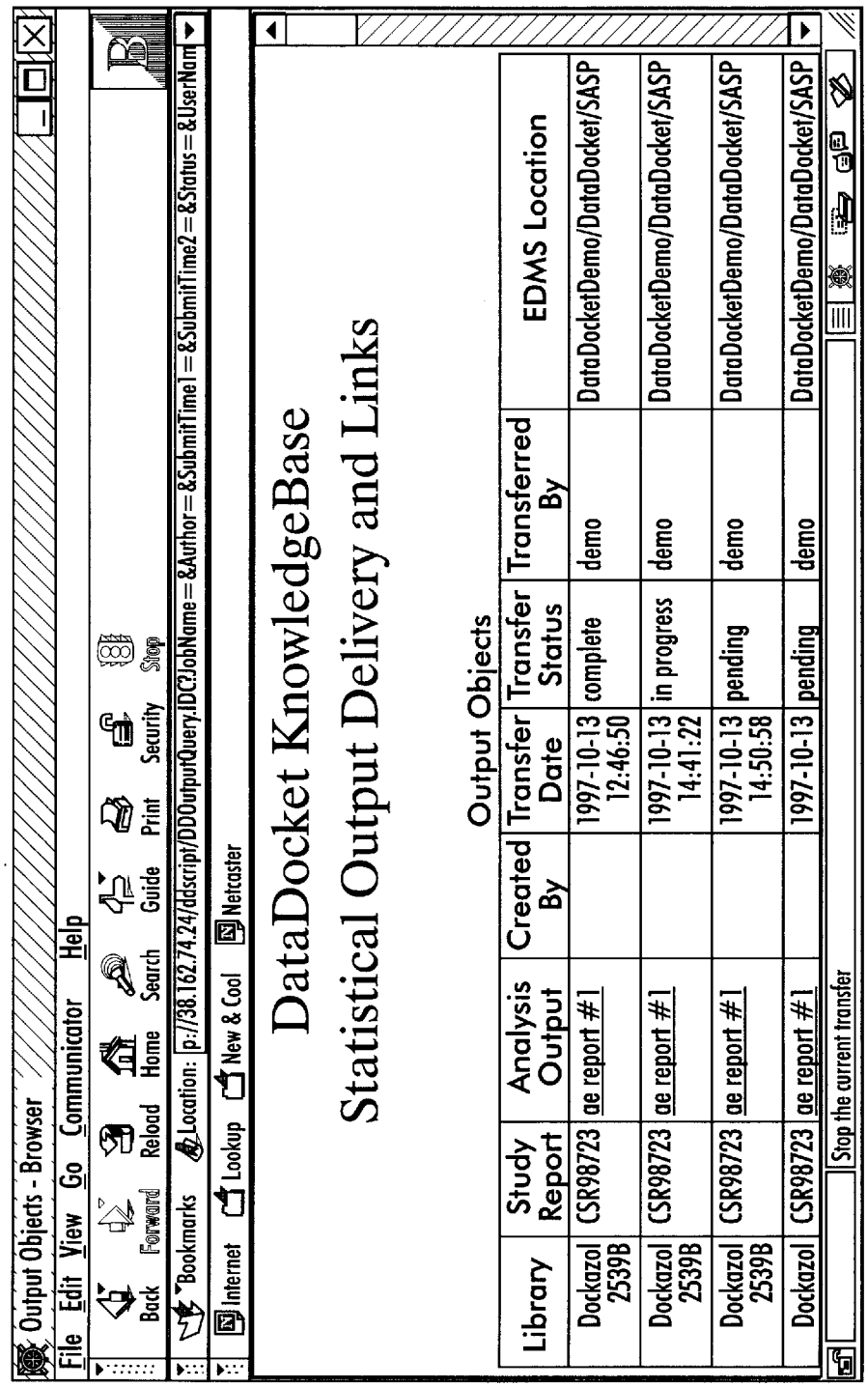

The recordation of context information or metadata in the knowledgebase is illustrated by FIGS. 16 and 17. In particular, FIG. 16 illustrates a pair of windows 1610 and 1612. In browser window 1610, a user may select the "View Output Objects" link 1620 to invoke window 1612. Window 1612 enables a user to initiate a web-based query from his/her desktop to view those knowledgebase records having particular characteristics indicated as fields 161a–1614f, for example, the name of the analysis output (text field; 1614a), or transfer status (pull-down field; 1614e). Referring to FIG. 17, displayed therein is a representation of exemplary results that may be obtained in response to an Analysis Output search (e.g., search on "ae report #1").

In recapitulation, the present invention is a method and apparatus for first integrating the operation of various independent software applications directed to the management of information within an enterprise. The system architecture is, however, an expandable architecture, with built-in knowledge integration features that facilitate the monitoring of information flow into, out of, and between the integrated information management applications so as to assimilate knowledge information and facilitate the control of such information. Also included are additional tools which, using the knowledge information enable the more efficient use of the knowledge within an enterprise.

It is, therefore, apparent that there has been provided, in accordance with the present invention, a method and apparatus for managing and utilizing a knowledge repository for the purpose of enabling easy access, manipulation and visualization of complete and synchronized information contained in different types of software systems. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A knowledge integration system for providing application interoperability and synchronization between heterogeneous document and data sources, comprising:

a first database memory;

a data source suitable for independently performing data analysis operations using data stored within the first database to generate data and analysis results;

a document source, including a document database memory, for capturing knowledge and storing the knowledge in the form of documents, validating the accuracy of the knowledge, and making the captured knowledge available across a network; and a knowledge integration application, running on a client/server system having access to the data source and the document source, for managing the flow of information between the data source and the document source, thereby enabling the integration of data and analysis results with the documents and provide links to automatically update the documents upon a change in the data or analysis results.

2. The knowledge integration system of claim 1, wherein the knowledge integration application generates an audit trail to represent the flow of data.

3. The knowledge integration system of claim 1, wherein the knowledge integration application allows the versioning of data and analysis results, and the selection of a version for subsequent use.

4. The knowledge integration system of claim 1, wherein the knowledge integration application provides live linkages between data source objects and documents associated therewith.

5. The knowledge integration system of claim 1, further comprising a knowledge base that dynamically stores information about integration transactions.

6. The knowledge integration system of claim 5, wherein the information about integration transaction includes historical information characterizing the method of creation, the author and the completion date.

7. The knowledge integration system of claim 5, wherein the knowledge integration application, in response to information stored in the knowledge bank, automatically signals the initiation of work flow events as a part of the integration transaction.

8. The knowledge integration system of claim 6, wherein the information about integration transaction is displayed in a three-dimensional manner for a user.

9. A method for providing application interoperability and synchronization between heterogeneous document and data sources, comprising the steps of:

storing data in a first database memory;

performing data analysis operations using the data stored in the first database to generate data and analysis results;

independently storing knowledge, in the form of documents, in a document database, including validating the accuracy of the knowledge and making the stored knowledge available across a network;

managing the flow of information between the first database and the document database to enable the integration of the data and analysis results with the documents and to automatically update the documents upon the occurrence of a change in the data or analysis results.

10. The method of claim 9 further comprising embedding and executing "live" knowledge links stored in said documents and associated analysis data thereby allowing users to define and execute multiple tasks to be performed by one or more data or document applications within information content.

11. The method of claim 10 further comprising visualizing objects and linkages maintained in said first database and said document database, using a 3D interface and conceptual schema for access and manipulation of the enterprise information.

12. A knowledge integration system, comprising:

an application integration module for providing application interoperability and synchronization between heterogeneous document and data sources; and a knowledge integration module for facilitating archiving of knowledge-related context and providing the ability to access and assess past, present and potential decisions, infrastructural setup, structuring processes, practices, and applications and the interactions between them.

13. The system of claim 12, further comprising:

a database memory for archiving of knowledge-related context, past, present and potential decisions, infrastructural setup, structuring processes, and practices.

14. The system of claim 13 further comprising a data source suitable for independently performing data analysis operations using data stored within said database to generate data and analysis results; and a document source, including a document database memory, for capturing knowledge and storing the knowledge in the form of documents, validating the accuracy of the knowledge, and making the captured knowledge available across a network.

15. The system of claim 14 wherein said knowledge integration module further comprises a knowledge integration application, running on a client/server system having access to the data source and the document source, for managing the flow of information between the data source and the document source, thereby enabling the integration of data and analysis results with the documents and provide links to automatically update the documents upon a change in the data or analysis results.

16. A knowledge integration system for providing application interoperability and synchronization between heterogeneous document and data sources, comprising:

a computer programmed for the utilization of knowledge integration middleware in conjunction with traditional application integration middleware to build and manage an integration knowledge repository;

a mechanism for bridging structured and unstructured data with uniform access to information;

integrated knowledge-based software applications that collectively enable information integration with knowledge linkage, visualization and utilization of structured, unstructured and work practice data and metadata produced by knowledge workers in an enterprise; and a knowledge repository containing record of integration transactions, context information from users and applications, information metadata catalog, knowledge access control, application activation rules, metadata and rules for knowledge integration, knowledge generation, knowledge visualization, "live" knowledge links, task execution, and case-based data for regulatory review.

17. The system of claim 16 further comprising a three dimensional (3D) interface in conjunction with a user-specific conceptual schema providing access to enterprise information wherever it is stored and managed.

18. A method of providing application interoperability and synchronization between heterogeneous document and data sources such as those currently managed by disparate enterprise document management and data analysis systems, comprising:

establishing and utilizing "live" links between an enterprise document management system and a statistical database;

enabling users to define and execute multiple tasks to be performed by one or more applications from anywhere within a document where the flow of textual and numerical analysis information are systematically synchronized;

automating the process of transferring data analysis reports to a document management system for document production, synchronize information flow between data and documents, and provide linkages back to data analysis software.

19. The method of claim 18 further comprising embedding and executing "live" knowledge links stored in documents and associated analysis data thereby allowing users to define and execute multiple tasks to be performed by one or more data or document applications within information content.

20. The method of claim 19 further comprising visualizing objects and linkages maintained in the integration knowledge base, using a 3D interface and conceptual schema for access and manipulation of the enterprise information.

* * * * *

(12) EX PARTE REEXAMINATION CERTIFICATE (9214th)
United States Patent
Swartz et al.

(10) Number: US 6,236,994 C1
(45) Certificate Issued: Aug. 21, 2012

(54) METHOD AND APPARATUS FOR THE INTEGRATION OF INFORMATION AND KNOWLEDGE

(75) Inventors: Ronald M. Swartz, Dresher, PA (US); Jeffrey L. Winkler, Collegeville, PA (US); Evelyn A. Janos, West Chester, PA (US); Igor Markidan, Cherry Hill, NJ (US); Qun Dou, North Wales, PA (US)

(73) Assignee: Xerox Corporation, Rochester, NY (US)

Reexamination Request:
No. 90/011,232, Sep. 14, 2010

Reexamination Certificate for:
Patent No.: 6,236,994
Issued: May 22, 2001
Appl. No.: 09/106,335
Filed: Jun. 29, 1998

Related U.S. Application Data
(60) Provisional application No. 60/062,933, filed on Oct. 21, 1997.

(51) Int. Cl.
*G06F 17/30* (2006.01)

(52) U.S. Cl. .......................... 707/6; 707/101; 707/102; 707/104

(58) Field of Classification Search ....................... None
See application file for complete search history.

(56) References Cited

To view the complete listing of prior art documents cited during the proceeding for Reexamination Control Number 90/011,232, please refer to the USPTO's public Patent Application Information Retrieval (PAIR) system under the Display References tab.

*Primary Examiner* — Karin M. Reichle

(57) ABSTRACT

The present invention is a method and apparatus for first integrating the operation of various independent software applications directed to the management of information within an enterprise. The system architecture is, however, an expandable architecture, with built-in knowledge integration features that facilitate the monitoring of information flow into, out of, and between the integrated information management applications so as to assimilate knowledge information and facilitate the control of such information. Also included are additional tools which, using the knowledge information enable the more efficient use of the knowledge within an enterprise, including the ability to develop a context for and visualization of such knowledge.

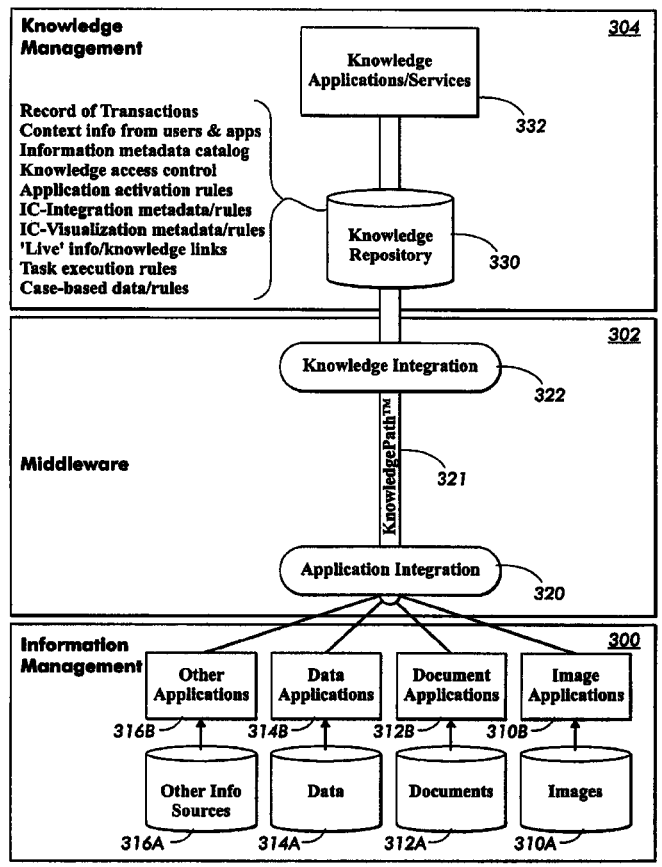

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8, 10 and 11 is confirmed.

Claims 12-20 are cancelled.

Claim 9 is determined to be patentable as amended.

9. A method for providing application interoperability and synchronization between heterogeneous document and data sources *using a knowledge integration application, running on a client/server system having access to the document and data sources*, comprising the steps of:

storing data in a first database memory;

performing data analysis operations using the data stored in the first database to generate data and analysis results;

independently storing knowledge, in the form of documents, in a document database, including validating the accuracy of the knowledge and making the stored knowledge available across a network;

managing the flow of information between the first database and the document database *using the knowledge integration application* to enable the integration of the data and analysis results with the documents and to automatically update the documents upon the occurrence of a change in the data or analysis results.

* * * * *